US012743207B2

(12) United States Patent
Helmick et al.

(10) Patent No.: US 12,743,207 B2
(45) Date of Patent: Sep. 22, 2026

(54) MULTITENANCY SSD CONFIGURATION

(71) Applicant: Samsung Electronics Co., Ltd., Suwon-si (KR)

(72) Inventors: Daniel Lee Helmick, Thornton, CO (US); Mark Allen Gaertner, Fort Myers, FL (US); Chun-Chu Chen-Jhy Archie Wu, San Carlos, CA (US); Siamak Arya, Cupertino, CA (US); Vipin Kumar Agrawal, San Jose, CA (US); Vasili Zhdankin, Prior Lake, MN (US); Sumanth Jannyavula Venkata, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 190 days.

(21) Appl. No.: 18/634,873

(22) Filed: Apr. 12, 2024

(65) Prior Publication Data

US 2024/0354004 A1 Oct. 24, 2024

Related U.S. Application Data

(60) Provisional application No. 63/550,033, filed on Feb. 5, 2024, provisional application No. 63/460,300, filed on Apr. 18, 2023.

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ...... G06F 3/061; G06F 3/0653; G06F 3/0659; G06F 3/0679; G06F 2212/1016; G06F 2212/202; G06F 2212/214
See application file for complete search history.

(56) References Cited

U.S. PATENT DOCUMENTS 11,797,187 B2 10/2023 Canepa
2012/0254269 A1* 10/2012 Carmichael ......... H04L 43/0876 709/224

(Continued)

FOREIGN PATENT DOCUMENTS

CN 112199044 A 1/2021

OTHER PUBLICATIONS

"Configure disks to meet performance requirements", Google iCloud, pp. 1-8, Dec. 29, 2023.

(Continued)

*Primary Examiner* — Larry T Mackall
(74) *Attorney, Agent, or Firm* — Renaissance IP Law Group LLP

(57) ABSTRACT

Provided are systems, methods, and apparatuses for multi-tenancy SSD configuration. In one or more examples, the systems, devices, and methods include identifying an identifier of a first tenant of a storage device and assigning a first performance level to the first tenant. In one or more examples, the systems, devices, and methods include generating a first performance parameter based on the first performance level and sending, to the storage device, a configuration message comprising the first performance parameter and the identifier of the first tenant.

20 Claims, 19 Drawing Sheets

(56) References Cited

U.S. PATENT DOCUMENTS

| | | | | |
|---|---|---|---|---|
| 2015/0312126 | A1* | 10/2015 | Deshpande | H04L 41/0896 709/216 |
| 2016/0334998 | A1* | 11/2016 | George | G06F 3/067 |
| 2021/0240393 | A1* | 8/2021 | Jo | G06F 13/24 |
| 2022/0057959 | A1* | 2/2022 | Yang | G06F 13/28 |
| 2023/0342037 | A1 | 10/2023 | Sahin et al. | |
| 2023/0342056 | A1 | 10/2023 | Shao et al. | |
| 2023/0344729 | A1 | 10/2023 | Dippenaar et al. | |
| 2024/0012583 | A1 | 1/2024 | Vohra et al. | |

OTHER PUBLICATIONS

Min, Jaehong et al., “Gimbal: enabling multi-tenant storage disaggregation on SmartNIC JBOFs”, SIGCOMM ’21: Proceedings of the 2021 ACM SIGCOMM 2021 Conference, Aug. 2021, pp. 106-122.

* cited by examiner

Endurance Group 305

RUH 310

RUH 315

...

RUH 320

RG 325

RU 345a

RU 345b

RU 345c

...

RU 345d

RG 330

RU 350a

RU 350b

RU 350c

...

RU 350d

RG 335

RU 355a

RU 355b

RU 355c

...

RU 355d

...

RG 340

RU 360a

RU 360b

RU 360c

...

RU 360d

400

Computing Resource 415

Host 405

Port 420

Port 425

Host 410

Physical Function 430

Virtual Function 435

Virtual Function 440

Host 410

VM 455

Core 445

Thread 475

Core 450

Thread 480

Container 460

Application 465

Programming Function 470

Hardware aspects

Software aspects

MULTITENANCY SSD CONFIGURATION

CROSS-REFERENCE TO RELATED APPLICATIONS

This application claims the benefit of U.S. Provisional Patent Application Ser. No. 63/460,300 filed Apr. 18, 2023 and of U.S. Provisional Patent Application Ser. No. 63/550,033 filed Feb. 5, 2024, which are incorporated by reference herein for all purposes.

TECHNICAL FIELD

The disclosure relates generally to memory systems, and more particularly to multitenancy SSD configuration.

BACKGROUND

The present background section is intended to provide context only, and the disclosure of any concept in this section does not constitute an admission that said concept is prior art.

Cloud computing is the delivery of computing services over the internet. These services include servers, storage, databases, networking, software, analytics, and intelligence. Multitenancy is when several different cloud customers are accessing the same computing resources, such as when several different companies are storing data on the same physical server.

The above information disclosed in this Background section is only for enhancement of understanding of the background of the disclosure and therefore it may contain information that does not constitute prior art.

SUMMARY

In various embodiments, the systems and methods described herein include systems, methods, and apparatuses for multitenancy SSD configuration. In some aspects, the techniques described herein relate to a method of multi-tenancy, the method including: identifying an identifier of a first tenant of a storage device; assigning a first performance level to the first tenant; generating a first performance parameter based on the first performance level; and sending, to the storage device, a configuration message including the first performance parameter and the identifier of the first tenant.

In some aspects, the techniques described herein relate to a method, wherein the identifier of the first tenant comprises a virtual function of the storage device and a reclaim unit handle of the storage device.

In some aspects, the techniques described herein relate to a method, wherein the identifier of the first tenant includes at least one of a physical function of the storage device, a port of the storage device, a stream of the storage device, a zone of the storage device, a logical block address range of the storage device, a non-volatile memory (NVM) controller of the storage device, a submission queue, or a scalable input output virtualization.

In some aspects, the techniques described herein relate to a method, wherein the identifier group of the storage device, a command type associated with a command generated by the first tenant, or a command identifier associated with the command generated by the first tenant.

In some aspects, the techniques described herein relate to a method, wherein the configuration message includes one or more tenant identifier fields.

In some aspects, the techniques described herein relate to a method, wherein the configuration message includes one or more performance parameter fields based on the first performance level, the one or more performance parameter fields including at least one field for a maximum allowed input output operations per second (IOPS) on the storage device for the first tenant or for a reserved level of IOPS on the storage device for the first tenant.

In some aspects, the techniques described herein relate to a method, wherein the configuration message includes one or more performance parameter fields based on the first performance level, the one or more performance parameter fields including at least one field for a maximum available communication bandwidth between the first tenant and the storage device or for a reserved level of communication bandwidth between the first tenant and the storage device.

In some aspects, the techniques described herein relate to a method, wherein: the configuration message includes a performance parameter field for a tenant load of the first tenant, the performance parameter field indicating a requested level of performance based on the first performance level, the tenant load of the first tenant includes at least one of a queue depth (QD) for commands generated by the first tenant or a command length associated with the commands generated by the first tenant.

In some aspects, the techniques described herein relate to a method, wherein the configuration message includes one or more performance parameter fields for at least one of: a proportional bandwidth win rate of the first tenant relative to a bandwidth win rate of at least one other tenant, a proportional IOPS win rate of the first tenant relative to an IOPS win rate of the at least one other tenant, a maximum level of variation in access to the storage device over a period of time, an access consistency level between the first tenant and the storage device, or a maximum allowed access latency between the first tenant and the storage device.

In some aspects, the techniques described herein relate to a method, further including: identifying an identifier of a second tenant; and assigning a second performance level to the second tenant different from the first performance level.

In some aspects, the techniques described herein relate to a method, further including generating a second performance parameter based on the second performance level, wherein: the second performance parameter is different from the first performance parameter, and the configuration message includes the second performance parameter and the identifier of the second tenant.

In some aspects, the techniques described herein relate to a method, wherein a format of the configuration message is based on a format of non-volatile memory express packets.

In some aspects, the techniques described herein relate to a method, wherein the storage device includes a solid-state drive.

In some aspects, the techniques described herein relate to a device, including: at least one memory; and at least one processor coupled with the at least one memory configured to: identify an identifier of a first tenant of a storage device; assign a first performance level to the first tenant; generate a first performance parameter based on the first performance level; and send, to the storage device, a configuration message including the first performance parameter and the identifier of the first tenant.

In some aspects, the techniques described herein relate to a device, further including: identify an identifier of a second tenant; and assign a second performance level to the second tenant different from the first performance level.

In some aspects, the techniques described herein relate to a device, wherein the at least one processor is configured to generate a second performance parameter based on the second performance level, wherein: the second performance parameter is different from the first performance parameter, and the configuration message includes the second performance parameter and the identifier of the second tenant.

In some aspects, the techniques described herein relate to a device, wherein the identifier of the first tenant comprises a virtual function of the storage device and a reclaim unit handle of the storage device.

In some aspects, the techniques described herein relate to a non-transitory computer-readable medium storing code that includes instructions executable by a processor of a device to: identify an identifier of a first tenant of a storage device; assign a first performance level to the first tenant; generate a first performance parameter based on the first performance level; and send, to the storage device, a configuration message including the first performance parameter and the identifier of the first tenant.

In some aspects, the techniques described herein relate to a non-transitory computer-readable medium, wherein the code includes further instructions executable by the processor to cause the device to: identify an identifier of a second tenant; and assign a second performance level to the second tenant different from the first performance level.

In some aspects, the techniques described herein relate to a non-transitory computer-readable medium, wherein the code includes further instructions executable by the processor to cause the device to generate a second performance parameter based on the second performance level, wherein: the second performance parameter is different from the first performance parameter, and the configuration message includes the second performance parameter and the identifier of the second tenant.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods described herein include multiple advantages and benefits. For example, the multitenancy systems and methods described herein improve the quality of service for host tenants, providing improved consistency in service within defined limits of service variation. The multitenancy systems and methods may decrease SSD latency for one or more tenants, thus improving the sharing of SSD access among multiple tenants. The multitenancy systems and methods enable balanced and tailored SSD operation, thus increasing the life and dependability of SSDs. The multitenancy systems and methods described herein provide improved application performance and infrastructure efficiency that improve overall data center system efficiencies and utilization. The multitenancy systems and methods provide improved control and customization of SSD access that enables the SSD to adapt to varying tenant loads among multiple tenants. Accordingly, the systems and methods described herein enable a host to specify or request the relative settings of various tenants with increased specificity.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
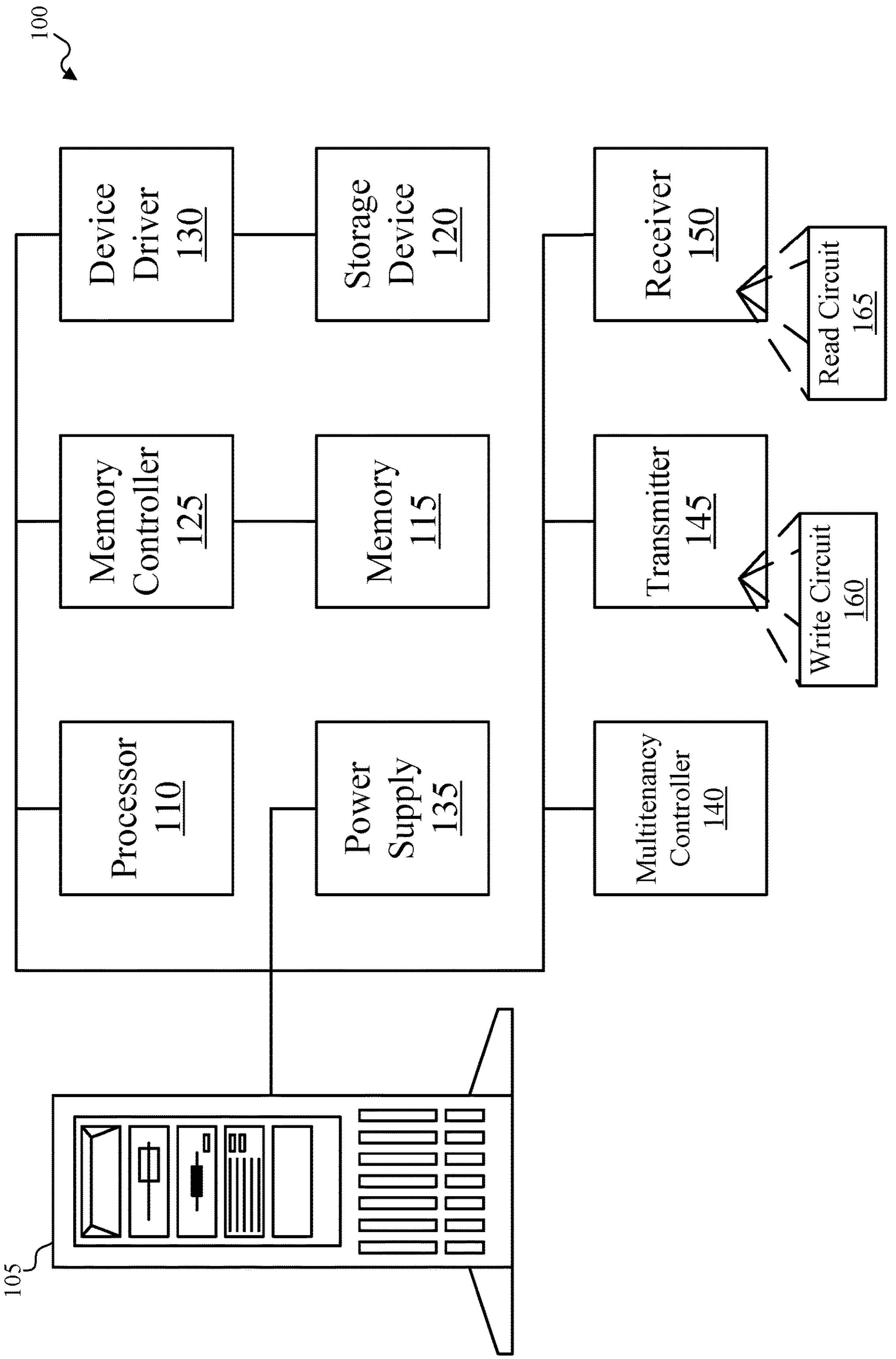
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term “or” is used herein in both the alternative and conjunctive sense, unless otherwise indicated. The terms “illustrative” and “example” are used to be examples with no indication of quality level. Like numbers refer to like elements throughout. Arrows in each of the figures depict bi-directional data flow and/or bi-directional data flow capabilities. The terms “path,” “pathway” and “route” are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), high bandwidth memory (HBM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described herein.

High Bandwidth Memory (HBM) can include a type of computer memory that uses 3D stacking technology to provide high-bandwidth and low power consumption. HBM can be used in high-performance computing applications where data speed is desired. HBM stacks can contain up to a number of DRAM modules (e.g., eight DRAM modules), with each module connected by two channels.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described herein with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with an example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

In some examples, solid-state drives (SSDs) are storage devices used in computers that store data on solid-state flash memory (e.g., NAND flash memory). NAND flash is a non-volatile storage technology that stores data without requiring power. NAND flash may be referred to as a memory chip. Flash memory cards and SSDs use multiple NAND flash memory chips to store data. In data management, "hot" data is data that is frequently accessed and/or in high demand, while "cold" data includes data that is infrequently accessed and/or infrequently in demand (e.g., set and forget data). Hot data can include data that is regularly in demand, data in transit or regularly in transit, and/or data that is stored for relatively short periods of time. Data hotness may be the relative degree of how often data is accessed or requested.

Hot data may be stored on media designed for rapid access, with multiple connections and high performance. Cold data may be stored on media with relatively slow access times. Cold storage is ideal for data that needs to be retained for extended periods and/or unlikely to change, such as historical records, compliance data, and legal documents. Thus, hot storage can be for data needed quickly or accessed frequently, and cold storage can be used for data you rarely need. Cold storage solutions often come with robust data security features, including encryption, access controls, and redundancy. Cold cloud storage is comparatively less expensive than warm or hot storage, but cold storage has a higher per-operation cost than other kinds of cloud storage.

SSDs can work with a computer's memory (random-access memory (RAM)) and processor to access and use data. This includes files like operating systems, programs, documents, games, images, media, etc. SSDs are permanent or non-volatile storage devices, meaning SSDs maintain stored data even when power to the computer is off. SSDs may be used as secondary storage in a computer's storage hierarchy.

In an SSD, a page can be the smallest unit, while a block can be the smallest unit of access. A page may be 4 kilobytes (KB) in size. Pages are made up of several memory cells and are the smallest unit of an SSD. Several pages on the SSD may be summarized to a block. A block is the smallest unit of access on an SSD (e.g., reading, writing, erasing, etc.). In some examples, 128 pages may be combined into one block, where a block includes 512 KB. A block may be referred to as an erase unit. The size of a block or erase unit determines the garbage collection (GC) granularity of the SSD (e.g., at the SSD software level). The logical block address (LBA) is the standard used to specify the address for read and write commands on an SSD. Most SSDs report their LBA size as 512 bytes, even though they use larger blocks physically. These blocks are typically 4 KiB, 8 KiB, or sometimes larger.

Unlike a hard disk drive (HDD), SSDs and other NAND flash storage do not overwrite existing data. Instead, SSDs can go through a program/erase cycle. SSD garbage collection (GC) is an automated process that improves the write performance of SSDs. The goal of garbage collection is to periodically optimize the drive so that it runs efficiently and maintains performance throughout its life. With SSD garbage collection, the SSD (e.g., a storage controller or storage processing unit of the SSD) searches for pages that have been marked as stale (e.g., data that is out-of-date, obsolete, or no longer accurate). The SSD copies data still in use to a new block and then deletes all data from the old one. The SSD marks the old data as invalid and writes the new data to a new physical location.

Computational storage can include a storage device architecture that allows data to be processed at the storage device level. Computational storage adds compute resources (e.g., processing units) to storage devices. Computational storage is also known as in-situ processing or in-storage compute. Computational storage devices have processors that can execute specific computational functions directly within the storage hardware. This allows for the ability to perform selected computing tasks within or adjacent to a storage device, rather than the central processor of a server or computer. Thus, computational storage reduces the amount of data that needs to move between the storage plane and the compute plane. Computational storage adds compute to storage in ways that drive efficiencies and enable enhanced complementary functions. Computational storage architectures improve application performance and infrastructure efficiency.

Peripheral component interconnect express (PCIe) can include an interface that connects high-speed data between electronic components in a computer system. PCIe can be used for connecting expansion cards to the motherboard, such as graphics cards, network cards, storage devices (e.g., SSDs), storage controllers, memory devices, memory controllers, processors, and the like. In some examples, PCIe slots can connect a computer motherboard to peripheral components (e.g., PCIe x1, PCIe x4, PCIe x8, PCIe x16). PCIe can be forwards and/or backwards compatible. For example, a PCIe 3.0 card can be put in a PCIe 4.0 slot, but the PCIe 3.0 card may be restricted to lower speeds of PCIe 3.0.

In some examples, non-volatile memory express (NVMe) is a data transfer protocol that may be configured to connect SSD storage to servers and/or processors using the PCIe bus. NVMe was created to improve speed and performance of computer systems. An NVMe controller can include a logical-device interface specification that allows access to a computer's non-volatile storage media. NVMe controllers are optimized for high-performance random read/write operations. In some cases, the NVMe controller can perform flash management operations of an SSD on-chip, while consuming negligible host processing and memory resources. NVMe can perform parallel input/output (I/O) operations with multicore processors to facilitate high throughput. NVMe controllers can map I/O and responses to shared memory in a host computer over a PCIe interface. In some cases, NVMe controllers can communicate directly with a host central processing unit (CPU).

In some examples, PCIe may use functions to enable separate access to its resources. These functions can include physical functions (e.g., PCIe physical function) and/or virtual functions (e.g., PCIe virtual function). In some cases, a PCIe device may be split into multiple physical functions. In some examples, the single root I/O virtualization (SR-IOV) interface is an extension to PCIe. SR-IOV can configure a physical device to appear as multiple separate physical devices (e.g., to a hypervisor, to a guest operating system, etc.). In some cases, SR-IOV allows a device (e.g., a network adapter) to separate access to its resources among various PCIe hardware functions. These functions can include physical functions (e.g., PCIe physical function) and/or virtual functions (e.g., PCIe virtual function). In some examples, SR-IOV may enable one PF0 and one or more VFs (e.g., where the VFs and PFs serve a similar function). In some cases, restructuring may provide various mixtures of PF and VF combinations.

In some cases, a PCIe physical function (PF) includes a primary function of a device. The PF can advertise the device's SR-IOV capabilities. A PF is a fully featured PCIe function that can be managed, discovered, and manipulated like any other PCIe device. A PF can configure its own behavior. In some cases, a PF can be associated with a parent device or control device (e.g., in a hardware virtualized environment). In some examples, a PCIe virtual functions (VF) includes a lightweight PCIe function on a network adapter that supports SR-IOV. A VF can share one or more physical resources of the device with the PF and/or other VFs on the device. For example, a VF can share one or more physical resources of the device (e.g., memory, network port, etc.) with the PF and other VFs on the device. Unlike a PF, a VF can only configure its own behavior. A VF can be associated with a child partition in a virtualized environment. In some examples, SR-IOV can be used for networking of virtual machines that are latency sensitive or require more CPU resources. It can also enable sharing a GPU's power across multiple users or VMs but providing a similar performance level of a discrete processor.

In some examples, a device may present one or more PFs (e.g., only PFs) to the Host. In some cases, one or more of the PFs may be assigned as a parent (e.g., given control features), enabling this PF to manage other PFs. Additionally, or alternatively, the other PFs (e.g., non-parent PFs)

may not be granted the privileges to manage themselves or other PFs. In some cases, a virtual function and/or physical function namespace can appear as a separate SSD to the connected host.

Write amplification (WA) can be based on a phenomenon that occurs when the amount of data written to storage media is more than the intended amount. This can happen in flash memory and solid-state drives (SSDs). WA occurs when a host computer writes a different amount of logical data than the amount of physical data written. In other words, WA occurs when the actual amount of written physical data differs from the amount of logical data that is written by the host computer. WA can be caused by a disconnect between the device and the host. The host may not have enough information to understand the device's physical layout or know about data that is often used together. WA can negatively affect the performance and durability of storage and can also shorten the life cycle of a device.

In some examples, write amplification factor (WAF) is a multiplier applied to data during write operations. WAF is the factor by which written data is amplified. WAF is calculated by dividing the amount of data written to flash media by the amount of data written by the host. An ideal SSD has a WAF of 1.0 (e.g., WAF=1). A WAF of 1 indicates there is no write amplification. SSDs may use wear leveling to evenly distribute writes across the drive, which can lead to write amplification. SSDs may use garbage collection to reclaim unused space, which can also lead to write amplification.

Some approaches to SSD data placement can result in write amplification that may be caused by storing different types of data (e.g., hot data, cold data) in the same NAND block (e.g., same erase unit). For example, at time 0, Block A includes pages a, b, c, d, and c:

Block A at time 0: [(a)(b)(c)(d)(e)]; a/c=hot data; b/d/e=cold data.

Pages a and c contain hot data, while pages b, d, and e contain cold data. As a result, the "hot" data of pages a and c is likely to be updated, while the "cold" data of pages b, d, and e is likely to remain unchanged for a given time period.

At time 1, Block A is selected as a garbage collection (GC) candidate. For example, at time 1, the version of pages a and c in Block A are out of data and the data in pages a and c are invalidated due to an update (e.g., an update to pages a and c):

Block A at time 1: [(a*)(b)(c*)(d)(c)]; a/c=*invalidated; b/d/e=cold data;

Accordingly, Block A is selected as a GC candidate based on pages a and c in Block A being out-of-date data (e.g., invalid or stale data). Because a block of flash memory is not capable of doing in-place update (e.g., updating page a and page c in Block A), at time 1+ (e.g., some time after time 1) the updated data for pages a and c is written to another block (e.g., Block C):

Block C at time 1+: [(a)(c)( )( )( )]; new version of a/c.

However, pages b, d and e of Block A are still valid (e.g., fresh data). Thus, at time 1+ (e.g., some time after time 1, before or after a and c are written to Block C) pages b, d and e are written to a new block before Block A can be erased (e.g., written to Block B, resulting in write amplification):

Block A at time 1+: [(a*)(b)(c*)(d)(e)]; a/c=*invalidated; b/d/e remain in Block A;

Block B at time 1+: [(b)(d)(e)( )( )]; b/d/e copied to Block B.

Accordingly, the data movement from Block A to Block B causes write amplification since pages b, d and e are now written twice in two separate blocks of NAND.

Flexible data placement (FDP) is a feature of the NVMe specification that aims to improve performance by reducing write amplification. FDP reduces write amplification (WA) when multiple applications are writing, modifying and reading data on the same device. FDP gives a host server more control over where data resides within an SSD. FDP does this by enabling the host to provide hints to the device when write requests occur. For example, the host might provide hints in write commands to indicate where to place the data via virtual handle or pointer. FDP's use-cases are similar to those of other NVMe features, such as Streams and zoned namespaces (ZNS). ZNS separates the logical address space into fixed-sized zones. ZNS devices divide functionality between the device controller and host software. Streams may include or be associated with a descriptor called Streams Granularity Size (SGS). SGS can be used in a manner similar to how RU size may be used. In some examples, stream number and RUH ID may be used interchangeably.

An endurance group can include a group of one or more reclaim groups. In some examples, an endurance group can include a separate pool of storage for wear leveling purposes. Each endurance group can have its own dedicated pool of spare blocks and the drive reports separate wear statistics for each endurance group. In some examples, NVMe Endurance Group Management allows media to be configured into Endurance Groups and NVM sets. Endurance groups can enable granularity of access to the SSD.

In an SSD, a reclaim unit (RU) is a unit of NVM storage. Data from an application is written to an RU, which is also known as a block or blocks (e.g., 128 pages or 512 KB block). A host system tells the SSD where to put data. For example, data from an application may be written to an application-specific area of the SSD, to a so-called reclaim unit. An RU may include one or more physical NAND blocks within a reclaim group. It is noted that without FDP, data from different applications is written across all the blocks. A reclaim unit can correspond to a physical memory unit and/or a logical memory unit. The SSD may be allowed to select which RU is being filled at any time, and the SSD may select which physical NAND composes each RU.

A reclaim unit handle (RUH) can be a resource in an SSD that manages and buffers logical blocks to write to an RU. Each RUH may identify a different RU for writing the user's data, and a new unique RU may be selected after filling the current RU. A reclaim group (RG) can be a group of two or more RUs. In some cases, a namespace can access one or more RUHs. In some implementations a Placement Identifier may be used to indirectly identify an RUH. In NVMe technology, an SSD namespace can be a collection of logical block addresses (LBAs) that are accessible to host software. In some cases, namespaces divide an NVMe SSD into logically separate and individually addressable storage spaces where each namespace can have its own I/O queue.

It is noted that a drive is free to select which RUs are used by the RUH at any time. In some cases, the RUH may be treated as a pointer to a particular RU at any one time. An RUH may point to one RU within an RG. In some cases, within an RG an RUH may have one RU it is pointing to and filling at a given time. The RU can change and be selected by the drive anytime the RU fills and a new RU selection is used. In some cases, an RG may be considered a physical boundary. For example, a die may be one RG, there may be one RG per die, there may be one RG for all the die on a channel, etc. RUs can be the same size. Several erase blocks (EBs) may get grouped together to form an RU. In some cases, the EBs that back an RU can be changed at any time. An RUH can be a pointer. The pointer can identify one RU inside of each RG. An RG/RUH pair can individually identify one RU that is presently getting filled with data. Thus, there can be one RG per tenant, one RUH per tenant, and/or one RG/RUH pair per tenant. In some cases, RU per tenant may not be configurable since RUs may not be addressable by the host.

In some examples, a virtual machine (VM) can be the virtualization or emulation of a computer system. Virtual machines can be based on computer architectures and provide the functionality of a physical computer. Their implementations may involve specialized hardware, software, or a combination of the two. In some cases, virtual machines can differ and can be organized by their function, shown here:

A VM can include a software-based computer that acts like a physical computer. VMs can be referred to as guest machines. VMs can be created by borrowing resources from a physical host computer or a remote server. One or more virtual "guest" machines run on a physical "host" machine.

A hypervisor, also known as a virtual machine monitor (VMM) or virtualizer, can include a type of computer software, firmware, and/or hardware that creates and runs virtual machines. The term hypervisor can be a variant of "supervisor," a term that can be used for the kernel of an operating system: the hypervisor can be considered the supervisor of the supervisors, with hyper—being used as a stronger variant of super—from "supervisor." A computer on which a hypervisor runs one or more virtual machines can be referred to as a host machine, and each virtual machine can be referred to as a guest machine. The hypervisor presents the guest operating systems with a virtual operating platform and manages the execution of the guest operating systems. Unlike an emulator, the guest executes most instructions on the native hardware. Multiple instances of a variety of operating systems may share the virtualized hardware resources: for example, Linux, Windows, and macOS instances can all run on a single physical x86 machine. This contrasts with operating-system-level virtualization, where all instances (usually called containers) must share a single kernel, though the guest operating systems can differ in user space, such as different Linux distributions with the same kernel.

In some cases, a hypervisor allows a single host computer to support multiple VMs by sharing resources, like memory and processing, etc. A hypervisor can does this by allocating the host server's compute, storage, and networking resources as needed by each VM. In some cases, a hypervisor enables virtualization of the compute and hardware resources of computers and servers, which can be enables cloud computing. In some cases, hypervisor isolates the hypervisor operating system and resources from the VMs, and enables the creation and management of those VMs. The VMs may not be aware their access to the hardware is virtualized, emulated, or protected from other users of the same hardware.

In some examples, multitenancy includes an architectural design that allows multiple users to access a single application or system. Multitenancy can include an architecture (e.g., multitenant architecture) where a software application or system serves multiple tenants, or customers, on a shared infrastructure. In cloud computing, multitenancy can refer to multiple customers allowed to use one or more shared SSDs. Multitenancy can create isolated environments within a single physical infrastructure, such as a virtual machine, server, cloud platform, etc. The instances (tenants) can be logically isolated, but physically integrated (e.g., using same storage device, memory device, and/or processing unit, etc.).

In some examples, multitenancy can include isolated tenancy where each tenant's data and computational resources can be kept separate. In some cases, multitenancy can include shared tenancy where all customer data can be stored in hosted yet shared servers, storage, and/or databases. Additionally, or alternatively, multitenancy can include hybrid tenancy that includes a combination of two or more multitenancy types. Isolation of tenants can include persistent isolation (e.g., a persistently isolated tenant is isolated from other tenants permanently, or for as long as a host or hypervisor designates the tenant as persistently isolated) and initial isolation (e.g., an initially isolated tenant is isolated temporarily from at least one other tenant, such as adding a new tenant, initial configuration of the tenant, etc.).

In some cases, RocksDB is a high-performance embedded database for key-value data (e.g., persistent key-value store for fast storage). RocksDB can be optimized to exploit multi-core processors, and make efficient use of fast storage, such as SSDs, for input/output (I/O) bound workloads. RocksDB can be based on a log-structured merge-tree (LSM tree) data structure. RocksDB and other LSM tree databases may be examples of system applications that can differentiate varying levels of hot to cold data. In some cases, CacheLib may be a caching engine for web-scale services. CacheLib may include a library that provides a thread-safe application programming interface (API) for building caching services with high throughput and low overhead. CacheLib can allow services to customize and scale highly concurrent caches. These caches may be identified as having differing data heat. It may be desirable to place the cache layers on the drive to mirror the cache management structures that are in the host software.

In some examples, multitenancy can include shared software instances. In some cases, a multitenancy device (e.g., host, hypervisor, server, shared computing resource, cloud resource, etc.) can store metadata about each tenant and use this metadata to alter a software instance at runtime to fit each tenant's needs. In some cases, tenants can isolated from each other via permissions. Even though tenants may share the same software instance, each tenant can use and experience the software differently.

A multitenant cluster can be shared by multiple users and/or workloads (e.g., tenants). The operators of multitenant clusters can isolate tenants from each other to minimize the potential for damage that a compromised or malicious tenant can do to the cluster and other tenants. Also, cluster resources can be fairly allocated among tenants. Multitenant clusters can include several advantages over multiple, single-tenant clusters, such as reduced management overhead, reduced resource fragmentation, no need to wait for cluster creation for new tenants.

A multitenant architecture can be configured with one or more types of SSDs. Local SSDs includes SSDs that are physically attached to a server that hosts a VM instance. Local SSDs can offer high input/output operations per second (IOPS) and low latency. In some cases, local SSDs may be configured to provide temporary storage. Zoned storage SSDs can improve overall data center system efficiencies and utilization, enabling multitenancy. Provisioning high-capacity SSDs among tenants can provide multiple benefits, such as elevated performance, efficient resource utilization, etc.

Multitenancy Tenant isolation. One of the biggest considerations in the design of a multitenant architecture is the level of isolation that each tenant needs. Isolation can mean different things: Having a single shared infrastructure, with separate instances of your application and separate databases for each tenant.

Asynchronous Transfer Mode (ATM) can include a telecommunications standard for digital transmission of multiple types of traffic. ATM was designed to integrate telecommunication networks. ATM can handle both traditional high-throughput data traffic and real-time, low-latency content such as telephony (voice) and video. ATM can provide functionality that uses features of circuit switching and packet switching networks by using asynchronous time-division multiplexing.

In the open systems interconnection (OSI) reference model data link layer (layer 2), the basic transfer units can be called frames. In ATM these frames can be of a fixed length (e.g., 53 octets) called cells. ATM can use a connection-oriented model in which a virtual circuit must be established between two endpoints before the data exchange begins. These virtual circuits may be either permanent (e.g., dedicated connections that can be pre-configured by the service provider), or switched (e.g., set up on a per-call basis using signaling and disconnected when the call can be terminated).

The ATM network reference model can approximately maps to the three lowest layers of the OSI model: physical layer, data link layer, and network layer. ATM can include a core protocol used in the synchronous optical networking and synchronous digital hierarchy (e.g., synchronous optical network (SONET), synchronous digital hierarchy (SDH)) backbone of the public switched telephone network and in the integrated services digital network (ISDN).

In computer networking, a network service can include an application running at the network application layer and above, that provides data storage, manipulation, presentation, communication or other capability which can include often implemented using a client-server or peer-to-peer architecture based on application layer network protocols.

In some cases, each service can be provided by a server component running on one or more computers (often a dedicated server computer offering multiple services) and accessed via a network by client components running on other devices. However, the client and server components can both be run on the same machine. Clients and servers will often have a user interface, and sometimes other hardware associated with it.

In computer network programming, the application layer can include an abstraction layer reserved for communications protocols and methods designed for process-to-process communications across an IP network. Application layer protocols use the underlying transport layer protocols to establish host-to-host connections for network services.

When a network service (e.g., application) uses a broadband network (e.g., an ATM network) to transport traffic, the network service may inform the network regarding what kind of traffic is to be transported and/or the performance requirements of that traffic. The application presents this information to the network in the form of a traffic contract. Besides determining service types based on service rates, the ATM Forum may define QoS and traffic parameters to measure ATM service quality. Before an ATM connection is established, QoS and traffic parameters can be negotiated between an ATM user and the ATM network or between two ATM networks. These negotiated parameters can form a traffic contract.

When a connection can be requested by an application, the application can indicate to the network the type of service being requested (e.g., level of service, relatively high data rate service, relatively low data rate service, etc.), the parameters of each data flow in both directions, and/or the quality of service (QOS) parameters requested in each direction. These parameters can form at least a portion of a communication descriptor (e.g., traffic descriptor, access descriptor) for the connection.

These service categories can provide a method to relate traffic characteristics and QoS requirements to network behavior. The service categories can be characterized as being real-time or non-real-time. The real-time service categories can include at least one of constant bit rate (CBR) and/or real-time variable bit rate (rt-VBR). The non-real-time service categories can include unspecified bit rate (UBR), adaptive bit rate (ABR), and/or non-real-time variable bit rate (nrt-VBR).

In communications, traffic policing can include the process of monitoring network traffic for compliance with a traffic contract and taking steps to enforce that contract. For example, a NAND may have an available bandwidth or access capability. Thus, an SSD controller (e.g., firmware and/or hardware) may implement a traffic policing scheme such that the traffic contract is upheld by the SSD. Traffic sources which are aware of a traffic contract may apply traffic shaping to ensure their output stays within the contract, thus avoiding being discarded. Traffic exceeding a traffic contract may be discarded immediately, throttled, held back and released later, marked as non-compliant, or left as-can be, depending on administrative policy and the characteristics of the excess traffic. The recipient of traffic that has been policed will observe packet loss distributed throughout periods when incoming traffic exceeded the contract. In some cases, the recipient may observe reduced performance (e.g., throttled bandwidth, delayed I/O completions, and/or a reduced/retarded completion rate. If the source does not limit its sending rate (for example, through a feedback mechanism), this will continue, and may appear to the recipient as if link errors or some other disruption can be causing random packet loss (e.g., as if the SSD may be underperforming). In some examples, an SSD may be tested in a synthetic test. For example, the host may maintain a queue of Y commands of size X constantly (e.g., a feedback mechanism of the host keeping the SSD load constant during the testing). If a policing event occurs, then the SSD's performance may be lower during the event (e.g., lower bandwidth and/or longer latency per command during execution). This throttling may back-pressure the host because the SSD slows or stops taking commands off the submission queue, and the host does not need to replenish the SQ as much. The received traffic, which has experienced policing en route, will typically comply with the contract, although jitter may be introduced by elements in the network downstream of the policer. With reliable protocols, such as TCP as opposed to UDP, the dropped packets will not be acknowledged by the receiver, and therefore will be resent by the emitter, thus generating more traffic. In some cases, since an SSD cannot drop commands, the SSD may perform slower. In a real-world application rather than a synthetic one, the host may submit the same amount of work to the SSD, but the work may take longer based on the loads.

Traffic policing in ATM networks can be referred to as Usage/Network Parameter Control. The network can also discard non-conformant traffic in the network (e.g., using Priority Control). A reference for both traffic policing and traffic shaping in ATM (given by the ATM Forum and the ITU-T) can include the generic cell rate algorithm (GCRA). GCRA can include a scheduling algorithm used in ATM networks. In some cases, GCRA measures the timing of cells on virtual channels (VCs) and virtual paths (VPs) against bandwidth and jitter limits. GCRA can include a version of the leaky bucket algorithm. In some cases, GCRA works by dividing time into cells of a certain size (e.g., cells of one second). When a request is made, a new cell can be created. When the number of requests in a cell exceeds the limit, all subsequent requests can be blocked until the next cell. For example, when the rate limit is 10,000 requests/hour, then GCRA can ensure that users are not allowed to make all 10,000 requests in a relatively short time period.

The leaky bucket is an algorithm based on an analogy of how a bucket with a constant leak will overflow if either the average rate at which water is poured in exceeds the rate at which the bucket leaks or if more water than the capacity of the bucket is poured in all at once. The leaky bucket algorithm can be used to determine whether some sequence of discrete events conforms to defined limits on their average and peak rates or frequencies, e.g. to limit the actions associated with these events to these rates or delay them until they do conform to the rates. The leaky bucket algorithm can be used to check conformance or limit to an average rate alone (e.g., remove any variation from the average). The leaky bucket algorithm can be used in packet-switched computer networks and telecommunications networks in traffic policing, traffic shaping, and/or scheduling of data transmissions, in the form of packets, to defined limits on bandwidth and burstiness (e.g., a measure of the variations in the traffic flow).

A version of the leaky bucket, the generic cell rate algorithm, can be used with ATM networks in UPC and NPC at user-network interfaces or inter-network interfaces or network-to-network interfaces to protect a network from excessive traffic levels on connections routed through it. The generic cell rate algorithm, or an equivalent, may also be used to shape transmissions by a network interface card onto an ATM network.

The token bucket algorithm can be comparable to one of the two versions of the leaky bucket algorithm. This comparable version of the leaky bucket can be described on the relevant Wikipedia page as the leaky bucket algorithm as a meter. This can be a mirror image of the token bucket, in that conforming packets add fluid, equivalent to the tokens removed by a conforming packet in the token bucket algorithm, to a finite capacity bucket, from which this fluid then drains away at a constant rate, equivalent to the process in which tokens are added at a fixed rate.

In some cases, GCRA, leaky bucket, and token bucket algorithms are all reference algorithms. They may be used in the network standards because they are well known and well described. However, in implementation, other tokening, tracking, or arbitration schemes may be implemented to mimic these basic algorithms. The other implementations may enable hardware reduction in a drive's implementation, increased responsiveness, additional features beyond basic features, and/or other advantages. In some cases, it has become industry standard to communicate host requests in a framework understood by GCRA. A translation of these parameters may be used to a tokening scheme implemented in the drive (e.g., SSD). For example, communicating settings for GCRA to achieve the method of relating traffic characteristics and QoS requirements to network behavior, where the service categories can be characterized as being real-time or non-real-time (e.g., CBR, rt-VBR, UBR, ABR, nrt-VBR, etc.).

In some examples, statistical multiplexing is a technique that dynamically allocates time slots based on need. Statistical multiplexing can be a core technique behind the concept of Broadband Integrated Services Digital Networks based on ATM. In communication networks, statistical multiplexing can be performed by switching systems that merge data packets from multiple input lines and forward them to multiple outputs. In some cases, statistical multiplexing models can involve bursty and correlated input processes. Bursty can mean that several cell arrivals occur within a given time period (e.g., relatively at the same time). Bursty in an SSD context can mean that a group of commands are submitted into the SQ within a given time period. These commands may be a request for the SSD to perform some amount of work (read, write, deallocate, other command). The length of the commands or the number of LBAs impacted by the commands can vary. Thus, a burst can mean a large group of commands submitted together, a small number of commands with a large number of LBAs impacted, or any combination thereof.

A data packet may include a cyclic redundancy check (CRC) field. In some examples, the CRC field is a mathematical technique that detects errors in transmitted data. The CRC field can be used in digital networks and storage devices to protect against common types of errors on communication channels.

A data packet may include a frame check sequence (FCS) field. The FCS field can include a 2-byte or 4-byte field that is used to detect errors in frames transmitted across a network. The FCS can be added to a frame before transmission, and the destination can calculate a new FCS code. The destination can then compare the calculated code with the FCS bits of the received frame. When the FCS matches, the transmission can be considered successful. When the FCS does not match, the frame can be discarded and a retransmission of the frame can be requested.

GCRA may be analogized as two leaky buckets happening concurrently. One may be limiting and tokening the bandwidth, and the other may be limiting and tokening the number of commands (input/output operations). In this manner, it is possible for the read commands to have one GCRA applied to them, and the drive can then meet independent bandwidth and IOPS targets or a combination of them both when the command sizes are mixed. Similarly other GCRAs could be implemented concurrently on other command types (e.g., writes, deallocates, etc.). This allows the host to specify the behavior of each GCRA for each command type, and the drive can independently implement to the limits of each. One GCRA can be for read IOPS and bandwidth, one GCRA can be for write IOPS and bandwidth, and one GCRA can be for other commands.

In some approaches, there may be resource contentions for physical resources, such as which submission queue (SQ) is fetched and how many commands are fetched from each SQ at a time, per command metadata space, direct memory access (DMA) engine, which may be used for transferring data into the host memory or into the drive memory, access to the dynamic random-access memory (DRAM) of the drive, usage of the central processor unit (CPU) within the drive, buffer allocation (for reads, cached read data, prefetched read data, incoming write data, and/or other buffer usage), error correction decode unit, memory dies, memory channels, etc. This resource contention may be caused by operations from a program (e.g., incoming program writes, program garbage collection, etc.), erase commands, read commands (e.g., incoming reads, garbage collection reads). In some approaches, constrained resources may vary with level of workload and drive capacity.

In some systems and methods described herein, an access arbitration scheme may be implemented to at least a portion of resources in contention. For example, an arbitration scheme that grants a first tenant 30% access and a second tenant 70% access may be applied to SQ access and/or CPU access. At the SQ, allocation may be based on source tenant (e.g., read requests of a source tenant, program requests of a source tenant). However, at other resources, the 70/30 arbitration split may be applied to a different metric (e.g., die access time). For example, programs may be slower to execute than reads in some cases. In some examples, SQ entries (SQEs) may appear the same until an SSD brings the SQEs into the drive and parses them. In some cases, there could be a shared arbitration where the tenants get 30 or 70 blindly. However, there is the possibility the SQs are identified to the drive differently so that the SQs that possess only reads may be identified differently from the SQs that possess only writes. If this separated identification of SQ type occurs, then there could be a differentiated arbitration of (tenant_1, SQ_rd), (tenant_1, SQ_wr), (tenant_2, SQ_rd), (tenant_2, SQ_wr), etc. Because programs can be slower to execute, when program and read accesses to a die are arbitrated 30% read and 70% program with respect to die time, fewer programs than expected may complete in comparison to reads. Additionally, or alternatively, because the amount of data programmed may be more parallel in some memories, the total quantity of programed data sectors may exceed the number of individual reads that may complete in a similar amount of time for such a memory.

In some cases, write amplification or other costs associated with an access by a tenant may be attributed to that tenant's resource access allocation. For example, random writes by a tenant may increase write amplification for that tenant. Accordingly, garbage collection reads, writes, erases, and other potential activities required to perform the requested tenant's activities may come out of that tenant's die allocation time.

In some implementations, the host may give physical address access recommendations. Examples of physical address access recommendations include endurance groups, NVM sets, reclaim groups, flexible data placement (FDP) reclaim groups, FDP reclaim unit handles, streams, etc. In some examples, at least some reclaim unit handles (RUHs) of the initially isolated type may have a common WAF (or other cost) which determines frequency of garbage collection. In some examples, one or more (e.g., each) persistently isolated RUH may have its own individually determined WAF (or other cost). This WAF (or other cost) may be used to apply a consistent arbitration policy described herein. When calculating the die access time of an initially isolated tenant, it is possible the WAF of all initially isolated tenants can be a weighting factor. Thus, the entire group of initially isolated tenants are experiencing the same weighting factor in their die access time. In contrast, the drive may track the WAF of the persistently isolated RUHs individually. Thus, with a tenant identified and using a single persistently isolated RUH, the tenant may be individually weighted by its own WAF. If the WAF for this persistently isolated RUH is relatively high, then the die access may be impeded or arbitrated down in frequency. Additionally, or alternatively, if the WAF for this persistently isolated RUH is relatively low (e.g., very low), then the die access may be greatly improved for the purposes of programming new data to the NAND. The additional reads and writes required by the WAF of initially isolated or persistently isolated RUH to execute the required garbage collection may be allocated out of the time provided each RUH in persistently isolated or each RUH group for a group of initially isolated RUHs. RUHs are an example, but other identifiers may be considered and/or implemented.

In some examples, in order to achieve a fairness in access to each tenant's namespace, the systems and methods may extrapolate physical information from the RUH assigned to the namespace. Thus, the arbitration may focus on RUH or other physical address identifier previously named in paragraph 102. In some cases, there may be multiple namespaces, and at least some namespaces may be assigned a different RUH and/or provided the same or similar capacity (e.g., or other physical information). Accordingly, the namespaces may be arbitrated equally or more equally. Similarly, namespaces having RUHs associated with different capacity levels, over provisioning, RG utilizations, and/or different RUH configurations (e.g., shared RUHs) may be treated differently in arbitration.

Disclosed systems and methods may provide multitenant access to a resource. In some embodiments, multitenancy may refer to more than one entity (e.g., user, application, host, etc.) accessing a shared resource (e.g., storage, software, etc.). In a particular disclosed example, a device (e.g., a solid-state storage device) may be shared by more than one virtual machine (VM) of a host.

The systems and methods may include a host signaling a device to enable or disable a control mechanism on a particular tenant (e.g., VM). In some cases, a control mechanism (e.g., a multitenancy controller) may adjust (e.g., throttle) resource consumption of one or more tenants. In some cases, an aspect of the disclosure may relate to the device signaling the host that the throttling mechanism has been successfully enabled or disabled. Examples of tenants include VMs, physical functions of a storage device, virtual functions of a storage device, submission queues, namespaces, logical block address (LBA) ranges, etc.

In some examples, a storage device (e.g., SSD) may encounter resource contentions that may or may not invoke arbitration (e.g., depending on tenant workloads, number of tenants, etc.). One or more hosts (e.g., including a hypervisor, VMM, etc.) may be associated with the storage device. In some cases, each host may include one or more tenants. In one or more examples, the storage device and/or one or more hosts associated with the storage device may include a multitenancy controller. In some examples, a control mechanism of a multitenancy controller may be configured to adjust one or more parameters associated with multitenancy with the storage device. The parameters may include at least one of input/output (e.g., maximum) operations per second (IOPS) per tenant, bandwidth (e.g., maximum) per tenant, reserved (protected service level) IOPS, reserved bandwidth per tenant, quality of service (QOS) per tenant (e.g., variation of performance per tenant), tenant priority based on two or more tenant priorities, arbitration weight between tenants over contested resources, extensibility to different drives, workloads, and resource contention changes, write amplification factor (WAF) (e.g., performance adjusted based on WAF), and/or internal device traffic. In some cases, tenants may be internal to a device and arbitration policies may be applied to these tenants. In some cases, the control mechanisms may be applied to read traffic, write traffic, garbage collection, NAND flash operations, vendor specific media operation, deallocation operations, copy operations, and/or other types of operations, etc. In some cases, constrained and/or excess resources may change with workload and drive capacity. In some cases, when the multitenancy controller determines a resource may be in contention, the multitenancy controller may apply an arbitration scheme to that resource. The arbitration schemes implemented by the multitenancy controller may be configured to align with one or more standards (e.g., NVMe, PCIe, Networking Standards Bodies, ATM, OSI model, etc.).

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices (e.g., hard disk drives, etc.). In some cases, the term "storage unit" may encompass storage device 120 and memory 115.

Machine 105 may include power supply 135. Power supply 135 may provide power to machine 105 and its components. Power supply 135 may have a maximum amount of power that may be used (before exceeding the specifications of power supply 135): this information may be known to machine 105 and may be used, for example, by multitenancy controller 140 in determining tenants and/or a storage device (e.g., storage device 120) are operating within power constraints. Operating levels of power supply 135 may be adjusted based on the systems and methods described herein (e.g., increase voltage, decrease voltage, increase current, decrease current, etc.).

Machine 105 may include transmitter 145 and receiver 150. Transmitter 145 or receiver 150 may be respectively used to transmit or receive data (e.g., between a host and the storage device, between the storage device and one or more tenants, etc.). In some cases, transmitter 145 and/or receiver 150 may be used to communicate with memory 115 and/or storage device 120. Transmitter 145 may include write circuit 160, which may be used to write data to a register, memory 115, and/or the storage device. In a similar manner, receiver 150 may include read circuit 165, which may be used to read data from storage, such as a register, from memory 115 and/or storage device 120.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionality, multitenancy controller 140 functionality, and/or the like, may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), graphics processing units (GPUs), neural processing units (NPUs), tensor processing units (TPUs) and/or the like, executing instructions stored in any type of memory. In some embodiments, one or more components of multitenancy controller 140 may be implemented as a system-on-chip (SOC).

In some examples, multitenancy controller 140 may include any one or combination of logic (e.g., logical circuit), hardware (e.g., processing unit, memory, storage), software, firmware, and the like. In some cases, multitenancy controller 140 may perform one or more functions in conjunction with processor 110. In some cases, at least a portion of multitenancy controller 140 may be implemented in or by processor 110 and/or memory 115. The one or more logic circuits of multitenancy controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable multitenancy controller 140 to provide multitenancy SSD configuration. In some cases, multitenancy controller 140 may include a hypervisor, a virtual machine monitor (VMM), or virtualizer configured to perform one or more techniques described herein.

In one or more examples, multitenancy controller 140 may identify an identifier of a first tenant of a storage device and assign a first performance level to the first tenant. In some cases, multitenancy controller 140 may generate a first performance parameter based on the first performance level and send a configuration message to the storage device that includes the first performance parameter and the identifier of the first tenant. Based on the systems and methods described herein, multitenancy controller 140 improves the quality of service for host tenants, providing improved consistency in service within defined limits of service variation. Based on the systems and methods described herein, multitenancy controller 140 decreases SSD latency, thus improving SSD access among multiple tenants. Thus, multitenancy controller 140 enables balanced and tailored SSD operation, increasing the life and dependability of SSDs. Based on the systems and methods described herein, multitenancy controller 140 provides improved application performance and infrastructure efficiency that improve overall data center system efficiencies and utilization. Based on the systems and methods described herein, multitenancy controller 140 provides improved control and customization of SSD access that enables the SSD to adapt to varying tenant loads among multiple tenants. Accordingly, multitenancy controller 140 enables a host to specify or request the relative settings of various tenants with increased specificity.

Figure 2:
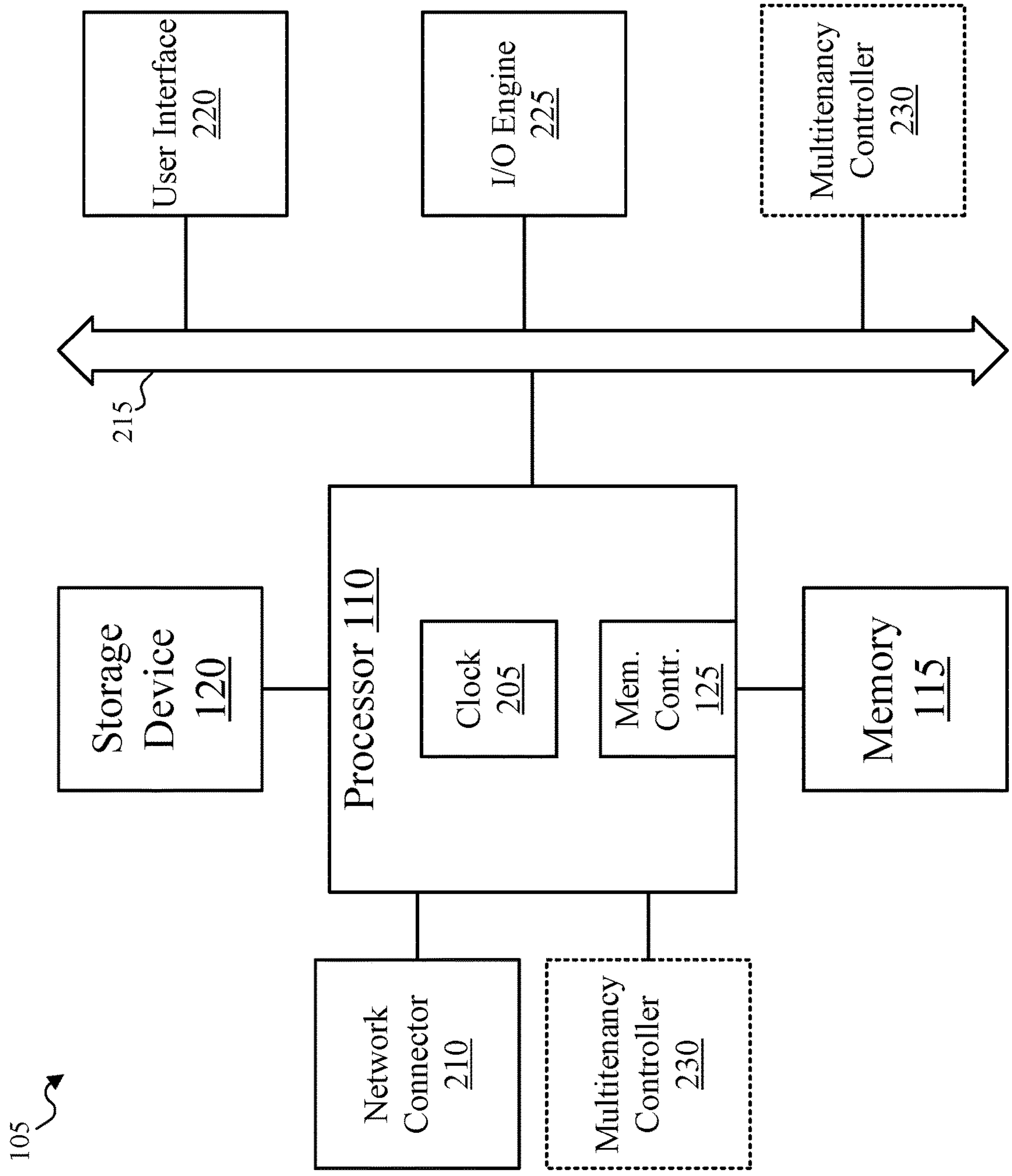
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to multitenancy controller 230, which may be an example of multitenancy controller 140 of FIG. 1. Additionally, or alternatively, processors 110 may be connected to buses 215, to which may be attached multitenancy controller 230.

Figure 3:
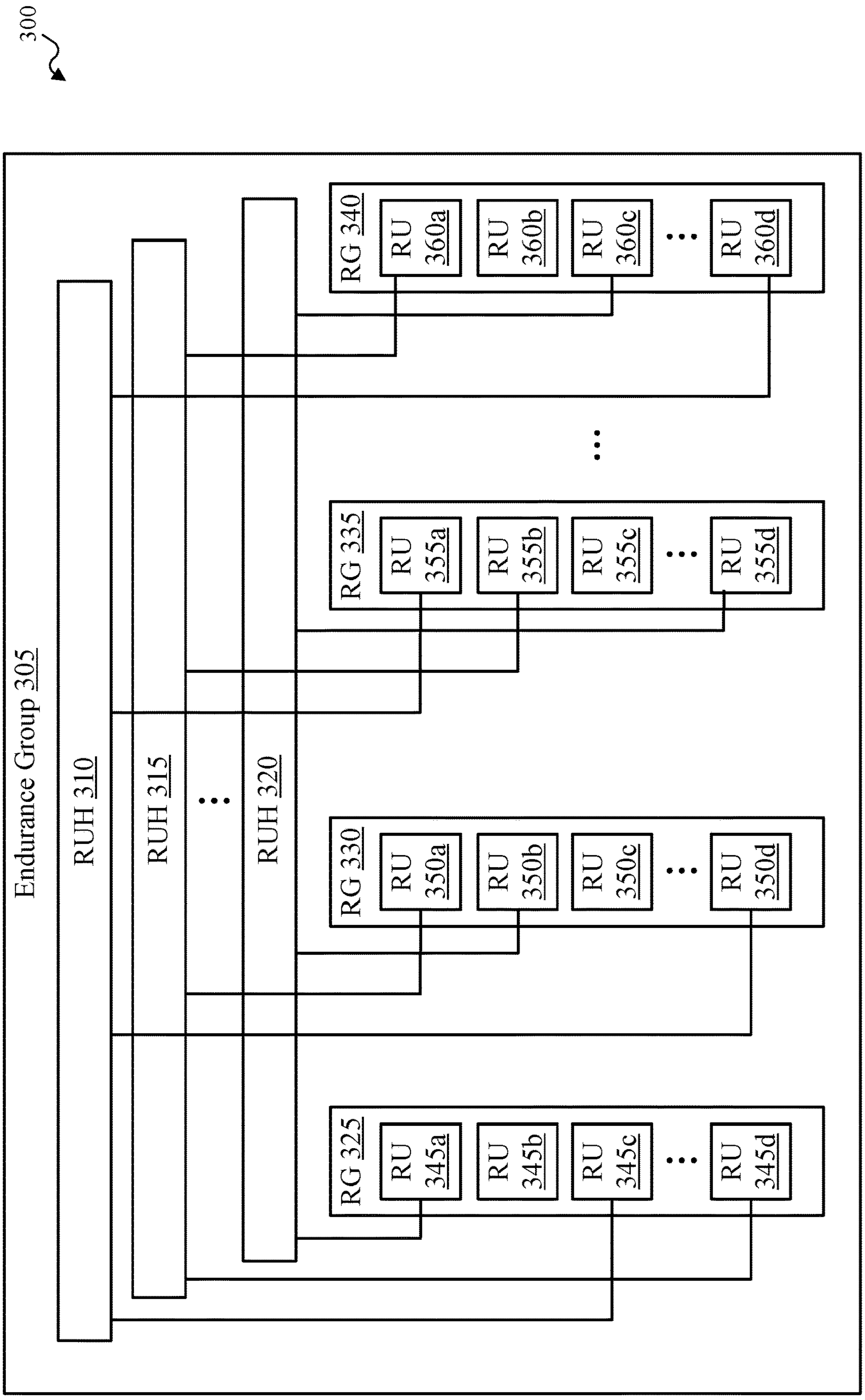
FIG. 3 illustrates an example system in accordance with one or more implementations as described herein.

FIG. 3 illustrates an example system 300 in accordance with one or more implementations as described herein. In the illustrated example, system 300 depicts aspects of a storage device (e.g., storage device 120, an SSD, etc.). As shown, system 300 includes endurance group 305. In some examples, system 300 indicates components that may be used by a host to assign NAND die time allocations to one or more tenants.

As shown, endurance group 305 can include one or more reclaim unit handles (RUHs) and/or one or more reclaim groups (RGs). In the illustrated example, endurance group 305 includes RUH 310, RUH 315, RUH 320 (e.g., up to RUH 320), RG 325, RG 330, RG 335, and RG 330. Each RG of endurance group 305 can include one or more reclaim units (RUs). In the illustrated example, RG 325 includes RU **345*a*, RU 345*b*, 345*c*, and RU 345*d* (e.g., up to RU 345*d*); RG 330 includes RU 350*a*, RU 350*b*, 350*c*, and RU 350*d* (e.g., up to RU 350*d*); RG 335 includes RU 355*a*, RU 355*b*, 355*c*, and RU 355*d* (e.g., up to RU 355*d*); and RG 340 includes RU 360*a*, RU 360*b*, 360*c*, and RU 360*d* (e.g., up to RU 360*d*). In the illustrated example, there may be up to M RUHs where M is a positive integer and RUH 320 is the Mth RUH. There may be N RGs where N is a positive integer and RG 340 is the Nth RG. There may be P RUs in RG 325 where P is a positive integer and RU 345*d* is the Pth RU. Similarly, there may be two or more RUs in RG 330, RG 335, and/or RG 340**.

In some examples, the systems and methods described herein may include aspects for reducing write amplification (e.g., based on flexible data placement (FDP)). In some examples, persistently isolated RUH tenants may have write amplification factor (WAF) or other relevant parameters for tracking NAND utilization (e.g., over-provisioning (OP), RU fullness/sparseness, etc.) calculated per tenant. A tenant may be defined by one interface identifier and one RUH. However, in some cases, one tenant may use more than one RUH or several tenants may share one RUH. In some cases, the parameters for tracking NAND utilization may be calculated per RUH (e.g., when each RUH corresponds to a single tenant, based on relationship of one tenant for one RUH). In some cases, an RUH may tracks NAND utilization and/or the parameters for tracking NAND utilization.

In some cases, WAF of a given tenant may affect the level of service provided to that tenant. In some examples, a persistently isolated (PI) RUH may correspond to a given tenant. The PI RUH can mean that GC is isolated and triggered separately from other tenants. In some cases, a controller (e.g., multitenancy controller 140) may estimate the WAF of the RUH. Assuming random write traffic, the blocks being garbage collected (GC'd) for a tenant may have a valid count that is getting GC'd. This valid count may be used in a look up table to correlate valid count to WAF and OP. Additionally, or alternatively, the controller may have a running measure of incoming writes and GC writes to formulate a WAF estimate. In some cases, a forget factor or low pass filter for this estimate. The WAF estimate may be applied as a modifier on the arbitration strength of the tenant and/or of the RUH. Thus, a tenant with WAF=1 sequential performance may be unmodified. A tenant with WAF=4 may be modified by one-fourth. The arbitration strengths of these two example tenants can vary based on the modified (initial arbitration strength value)*(WAF modifier). Alternatively, the two tenants may be allocated tokens based on available die time. The tokens for each tenant or RUH_ID may be assigned based on the host's assigned values. The GC that is triggered specific to each tenant may attribute all of the GC reads and GC writes to the tenant, and the GC traffic may be throttled based on the available token count for this tenant. The WAF modifier may be based on 1/WAF, 1/(alpha*WAF), and/or (alpha*WAF).

In some examples, a host may leverage the persistently isolated and initially isolated status of RUH tenants to penalize a tenant for a non-compliant WAF (e.g., tenant with WAF greater than 1, such as the tenant with WAF=4). The host may set up a tenant and RUH relationship. As an example, an SSD may have two persistently isolated (PI) and six initially isolated (II) RUHs. In some examples, the host may have ten tenants. The host may determine which tenant(s) is put on the two PI RUHs, and determine which tenant(s) are put on each of the six II RUHs. The host may put one or more tenants on each of the RUHs. Based on the WAF of a given tenant, the systems and methods may include using WAF to penalize the tenant (e.g., based on WAF exceeding a threshold) and/or reward the tenant (e.g., based on keeping WAF below a threshold). A tenant writing in a circular FIFO buffer could have the WAF=1 traffic considered for GC because the FIFO buffer can be coincidentally be near empty on an RU. Accordingly, the systems and methods may include rewarding the tenant based on protecting the tenant's data from premature garbage collection (GC). In some examples, the tenant may be on the host. Tenants may be doing the writing with write operations, for example. A FIFO may fill due to incoming traffic. The SSD may put the writes in an RU. When the RU being filled inside the drive reaches full capacity, another RU may be selected by the SSD. The new RU then continues to be filled. This may be considered the leading edge of the circular FIFO. At the same time, the trailing edge of the circular FIFO may be invalidated. This is because the host tenant may be writing the same LBAs. Thus, every new LBA coming into the end of the RU may be invalidating the LBA that is sitting stored in an older RU. As the old RUs continue to reduce their valid count, eventually an old RU may be invalidated due to the incoming traffic. However, there may be race conditions. In some cases, the old RU may about to be completely invalidated. But at this same moment, the SSD may trigger GC to free up space. Even though the circular FIFO is WAF=1, it is possible the valid count of the old RU is relatively small, and may be selected for GC. In some cases, persistently isolated RUHs may protect against this race condition (e.g., but not initially isolated RUHs). The II RUH may consider all of the old RUs in the SSD when selecting the RU for GC. Thus, another tenant may be causing the GC, but the WAF=1 traffic is still selected for GC.

In some examples, a set of initially isolated RUH tenants may have WAF spread over that set of tenants. In some cases, initially isolated (II) RUHs may do the associating. The SSD may track II RUHs together. In some examples, RGs and/or endurance groups (e.g., protected endurance groups) may be associated with one or more tenants. In some cases, an RG may be isolated, but they may permit the isolation to be violated under some circumstances (e.g., the drive experiences an error/exception condition, etc.). The NVMe standards that defines an RG allows the isolation boundaries to be violated by the drive in some situations. An SSD may still store the data, but the SSD may be given the freedom to violate RGs in some circumstances. One tenant routed to several RGs (e.g., to RG 330, RG 335, etc.) can enable this tenant to balance activity between the different RGs based on performance characteristics. In some cases, one tenant per RG/RUH (e.g., a tenant isolated to RG 330 and RU 350*b*) can enable partial isolation with RUH count per RG, providing a measure of partial isolation. For example, a tenant of RG 325 may be isolated to at least one RUH of RG 325 (e.g., RUH 315, RUH 320, etc.). Additionally, or alternatively, the tenant of RG 325 may share access to at least one RUH of RG 325 (e.g., isolated on RU 345*a*, and shared access to RU 345*b*, etc.). In some cases, the tenant may be routable to a subset of a NAND die. In some examples, tenants may be provided a level of performance based on the level of performance a tenant has subscribed to or requested. There may be any number of tiers of performance levels (e.g., two or more tiers). In some examples, a tier-1 tenant (e.g., highest priority tenants) may be assigned a first persistently isolated component of system 300 (e.g., a persistently isolated RUH, RG, NAND die, etc.), two tier-2 tenants (e.g., a lower service level) may be assigned to share a second persistently isolated component of system 300, four tier-3 tenants may be assigned to share a third persistently isolated component of system 300, ten tier-4 tenants may be assigned to share a fourth persistently isolated component of system 300, and fifteen tier-5 (e.g., lowest priority tenants) tenants may be assigned to share a fifth persistently isolated component of system 300. It is noted that there can be more tenants than RUHs. As indicated, RUHs may provide isolation (e.g., persistent isolation, initial isolation). Thus, assigning for example two tenants to an RUH may provide that the two tenants can impact each other, but may not be affected by other tenants outside these two tenants. Though not a complete isolation for a given tenant, it is a better isolation than getting impacted by every tenant. Although the example refers to persistently isolated components, the same arrangement may be applied to initially isolated components, to configurations of one tenant to one endurance group, to configurations of two tenants to a second endurance group, to one tenant to a die, to two tenants to a second die, to one tenant to a namespace, and so on. In some examples, persistently isolated and initially isolated can be attributes that may be applied to any combination of NAND resource arbitration elements. Examples of NAND resource arbitration elements can include RUHs RGs, endurance groups, namespace, etc. In some examples, a set of tenants may be associated with one or more RGs (e.g., RG 325 to RG 340). In some cases, high performance RG tenants get more die access in their respective RGs compared to low performance RG tenants. In some aspects, an SSD may describe an RG and/or RUH configuration. The host may set up the tenant relationships (e.g., based on the RG and/or RUH configuration). The host may send the settings to the SSD based on on the arbitration goals the host is requesting of the SSD. For example, a first tenant may be configured to win 70% of the time, while a second tenant may be configured to win 30% of the time. The SSD may be responsible for implementing this requested arbitration behavior to the best of the ability of the SSD. In some cases, a low-latency-focused tenant (e.g., with relatively small I/O) may be assigned to a dedicated channel (a channel to a die and/or at least one component of system 300) and/or a dedicated die that is not shared with other tenants. In some aspects, an RG may be a physical set of NAND. The definition of an RG may be defined by the SSD and communicated by the SSD (e.g., to the host, communicated to a customer/tenant). For example, a customer may request each RG to correspond to one die. An RUH_ID may point to an actively filling RU inside of each RG. In some systems, when the host isolates tenants per RG, then the host may fill in the RG value on the host prior to sending in the write command to the SSD. The RG value may be a field in the write command. However, based on the systems and methods described herein, a host is able to indicate that "VF_1 is to go into RG_1." Thus, the host may define a tenant as a combination of VF, RG, and/or RUH ID (e.g., three IDs per tenant). In some cases, at least one tenant ID may be used to arbitrate access. In some cases, a host may fill in the RUH value inside of the write command. Thus, assigning or filling in are provided based on the systems and methods described herein. In some examples, high-bandwidth focused tenants may be assigned an RG that stripes across channels. In some examples, a high performance tenant may be assigned to an RG with more dies or with fewer other tenants to contend for access to the RG.

In some examples, a set of tenants may be associated with one or more RG and RUH combinations. In some cases, at least one tenant may be assigned sole access to RUH 320 (where RUH 320 points to RU 345*a*, or where new data may be routed to be programmed and written). It is noted that there can be more tenants than RUHs. As indicated, RUHs may provide isolation (e.g., persistent isolation, initial isolation). Thus, assigning for example two tenants to an RUH may provide that the two tenants can impact each other, but may not be affected by other tenants outside these two tenants. Though not a complete isolation for a given tenant, it is a better isolation than getting impacted by every tenant. In some cases, at least one tenant may be assigned persistently isolated access to RG 330 combined with RU 350*b* and RU 350*c*, etc. In some examples, RUH type, number of tenants per RUH, and/or number of tenants per RG can provide a refined control over access granularity to a NAND by a host (e.g., machine 105). Persistently isolation may be an attribute of RUHs and may contribute to the way a drive is allowed to do GC (e.g., when GC is used on data in this RUH).

Figure 4:
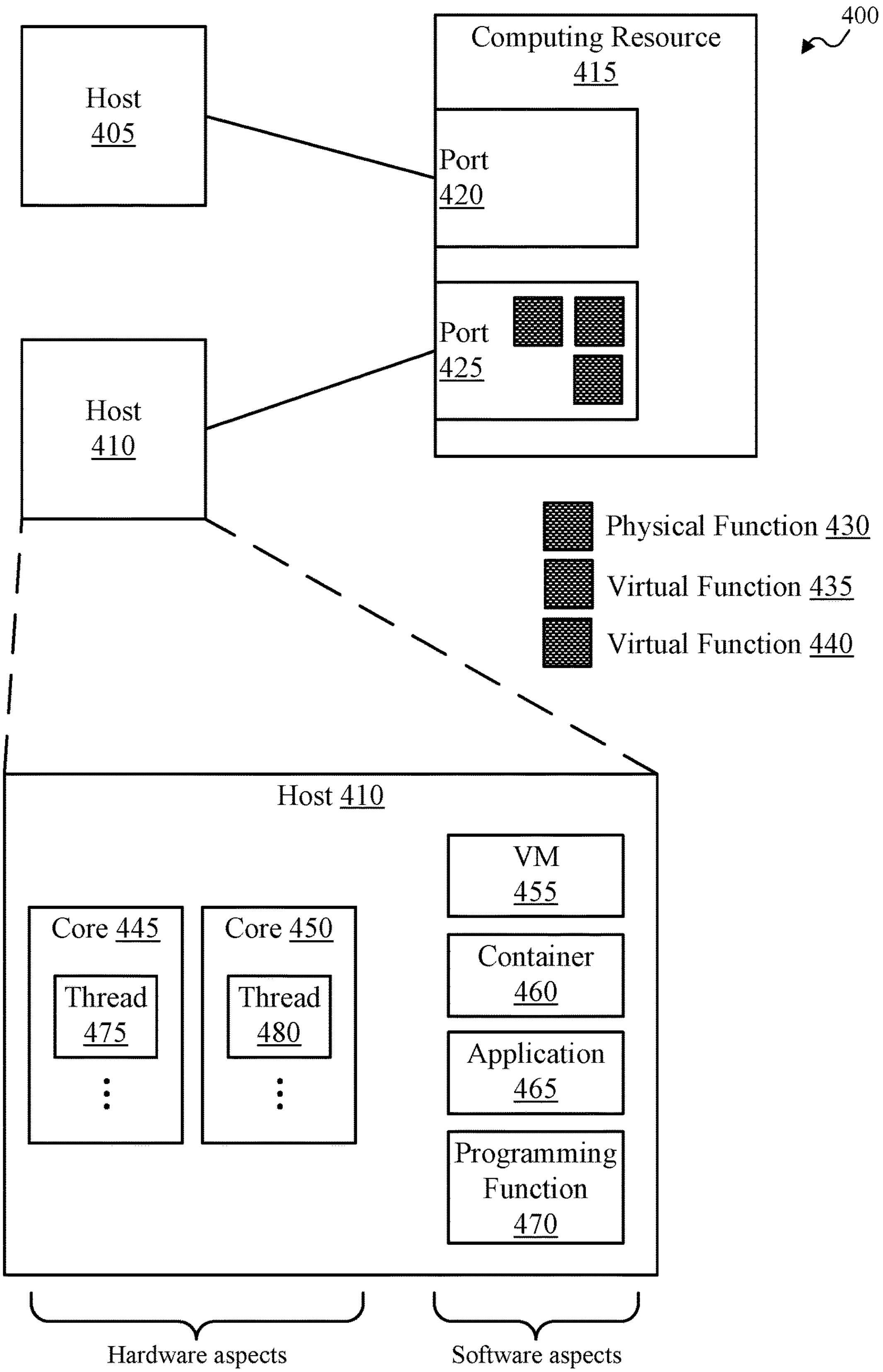
FIG. 4 illustrates an example system in accordance with one or more implementations as described herein.

FIG. 4 illustrates an example system 400 in accordance with one or more implementations as described herein. In the illustrated example, system 400 includes a host 405, a host 410, and a computing resource 415. The computing resource 415 may include at least one of a storage device (e.g., SSD, computational storage), a processing unit (e.g., CPU, GPU, NPU, ASIC, FPGA, SoC, etc.) a memory device ((e.g., DRAM, SRAM, HBM, memory controller, etc.), a communication channel, a network connection, and/or some other computation resource. In some cases, computing resource 415 is configured by host 405 and/or host 410 to provide NAND die time allocations to multiple tenants of host 405 and/or host 410. In some cases, a NAND die can take a given amount of time to perform for each operation. For example, a NAND may take 50 us for a read, 700 us for a program, 3 ms for an erase, command overheads, etc. Thus, the tenants may be viewed as arbitrating for die time. In some cases, a tenant may accumulate tokens to execute each operation on a NAND die. With enough tokens, the tenant is allowed to do its operation on the NAND die making it busy for a certain amount of time.

In the illustrated example, host 410 includes core 445. Core 450, virtual machine (VM) 455, container 460, application 465, and/or programming function 470. In some cases, host 405 and/or host 410 may be configured as a hypervisor or VMM. As shown, core 445 may include one or more threads (e.g., thread 475). Core 450 may include one or more threads (e.g., thread 480). In some cases, thread 475 and/or thread 480 may be based on a file system metadata thread, a cache of host 410, or a database of host 410 (e.g., with hot and cold data). In some aspects, host 410 may include hardware elements that result in at least a portion of host 410 being configured, managed, interfaced with, and/or viewed based on hardware aspects of host 410 (e.g., from the perspective of host 405, host 410, and/or computing resource 415). Additionally, or alternatively, host 410 may include software elements that result in at least a portion of host 410 being configured, managed, interfaced with, and/or viewed based on software aspects of host 410 (e.g., from the perspective of host 405, host 410, and/or computing resource 415). As shown, core 445 and/or core 450 may be configured, managed, interfaced with, and/or viewed from a hardware perspective. Additionally, or alternatively, VM 455, container 460, application 465, and/or programming function 470 may be configured, managed, interfaced with, and/or viewed from a software perspective. In some cases, physical function 430 may be associated with one or more hardware aspects of host 410. Additionally, or alternatively, virtual function 435 and/or virtual function 440 may be associated with one or more software aspects of host 410.

In the illustrated example, computing resource 415 may include one or more ports (e.g., port 420 and port 425). In some cases, port 420 and/or port 425 may include one or more functions (e.g., one or more physical functions and/or one or more virtual functions). As shown, port 425 may include physical function 430, virtual function 435, and virtual function 440. In some cases, at least one virtual function of computing resource 415 (e.g., virtual function 435) may be based on an NVMe controller (e.g., a virtual NVMe controller). In some cases, a tenant may be assigned an NVMe controller. The NVMe controller may include an identifier unique to that NVMe controller (e.g., different from identifiers of other NVMe controllers).

In one or more examples, computing resource 415 may present or describe its capabilities for supporting multi-tenancy. Computing resource 415 may be configured to support one or more multitenancy features. For example, computing resource 415 may be configured to support the features of SR-IOV and FDP among a set of multitenancy features. In some cases, host 410 may be configured to read and determine the capabilities of computing resource 415 (e.g., via a physical function, such as physical function 0 (PF0)). In some cases, PF0 may be a management and administration channel of computing resource 415 (e.g., control path access to computing resource 415). In some aspects, host 410 may identify tenants associated with host 410 and set up each tenant to be recognized by computing resource 415. In some examples, host 410 may identify core 445, thread 475, core 450, and thread 480 each as tenants, and/or any combination thereof as one or more tenants of computing resource 415. Additionally, or alternatively, host 410 may identify VM 455, container 460, application 465, and programming function 470 each as tenants, and/or any combination thereof as one or more tenants of computing resource 415.

When configuring a tenant on computing resource 415, host 410 may send one or more messages to computing resource 415. A message may include one or more fields. The fields of the message may include a tenant ID of at least one tenant. For example, a message sent by host 410 may include IDs of one or more tenants (e.g., IDs of two or more tenants to configure each tenant). The tenant ID may be based on one or more multitenancy features of computing resource 415 that are assigned to a tenant. A tenant ID may be associated to one or more identifiers in the drive. For example, the tenant VM 455 may be assigned one or more interface identifiers (e.g., virtual function 435) and one or more media access identifiers (e.g., an RUH of computing resource 415). Virtual function 435 may include a virtual function ID and the RUH may include an RUH ID. For example, the tenant ID may be associated with RUH 315 of endurance group 305 and RUH 315 may include an RUH ID. In some examples, the tenant ID may be associated with RU 350*a* of RG 330. Accordingly, the tenant ID of VM 455 may be based on virtual function ID and/or RUH ID (e.g., include at least a portion of virtual function ID and/or RUH ID). Thus, a message from host 410 may indicate that tenant VM 455 is linked to virtual function 435 and the RUH of computing resource 415. In some examples, the fields of the message from host 410 may include at least one parameter field that indicates parameters (e.g., multitenancy constraints) associated with a given tenant. Further aspects of a message from host 410 are discussed with reference to FIG. 5.

In some examples, VM 455 may be configured as a tenant by host 410. For example, each VM of host 410, including VM 455, may be configured with a virtualized memory space, virtualized compute resources, and/or a virtualized set of devices. A virtualized set of devices may include a virtual function (VF) of computing resource 415 (e.g., virtual function 435), where the VF is viewed as a complete computing resource by VM 455. In some cases, host 410 may create a namespace on computing resource 415 and configure an RUH (e.g., a default RUH, RUH 320 for example) for the namespace. Accordingly, VM 455 may be configured with a virtualized view of computing resource 415. Thus, the virtualized view of computing resource 415 that VM 455 sees may include virtual function 435 and an NVMe controller on virtual function 435. Additionally, or alternatively, the virtualized view of computing resource 415 that VM 455 sees may include at least one namespace with at least one associated RUH such as RUH 310 (e.g., as directed by host 410).

In some examples, computing resource 415 may receive a message on an NVMe controller that is on PF0. Computing resource 415 may process the message and implement the multitenancy settings of the message. In some cases, an SSD may describe its resources in some initialization phase, and the host may communicate to the SSD a requested performance level (e.g., a host may indicate it wants to use a respective set of IDs for a given set of tenants, and request the SSD to arbitrate one tenant against another tenant according to the respective performance levels when the resources are in contention).

In some examples, host 410 may determine to change or update multitenancy settings of at least one tenant. In some cases, host 410 may monitor the service received by each configured tenant of host 410. Host 410 may determine whether a level of service received by a tenant is in compliance with expected performance. When host 410 determines the level of service received by the tenant is not in compliance with expected performance, host 410 may update the multitenancy settings of one or more tenants (e.g., increase performance of one or more tenants and/or decrease performance of one or more tenants). In some cases, host 410 may consider WAF when determining the level of service received by a tenant is not in compliance with expected performance. In some cases, a tenant may construct its traffic to be more sequential that may reduce the tenant's WAF. Additionally, or alternatively, the tenant may deallocate space on the SSD to increase OP and improve WAF. The host's management software may query the SSD for performance and related logs. The tenant(s) may monitor the number of commands and/or the latency of those commands. For example, a sandboxing application (e.g., eBPF) may enable such monitoring. In some cases, the workload may be done during drive qualification to check for drive conformance to requested behavior. In some examples, host 410 may determine that a tenant should have better performance (e.g., performance is not in compliance and/or tenant has upgraded to a higher level of performance, etc.).

In some examples, host 410 may determine the current settings of the tenant (e.g., based at least in part on previously configuring the tenant). Host 410 may send the updated multitenancy settings to computing resource 415 (e.g., according to updated NVMe standards for this feature). In some cases, an SSD may describe its resources in some initialization phase, and the host may communicate to the SSD a requested performance level (e.g., a host may indicate it wants to use a respective set of IDs for a given set of tenants, and request the SSD to arbitrate one tenant against another tenant according to the respective performance levels when the resources are in contention). In some cases, host 410 may send one or more message (e.g., one or more data packets) to computing resource 415. Tenant VM 455 may be assigned virtual function 435 and an RUH of computing resource 415 (e.g., RUH 315 of endurance group 305). Virtual function 435 may include a virtual function ID and the RUH may include an RUH ID. Accordingly, the tenant ID of virtual function 435 may be based on virtual function ID and/or RUH ID (e.g., RUH ID of RUH 315).

In some examples, computing resource 415 receives the message from host 410 on an NVMe controller of a control channel (e.g., an NVMe controller on PF0). Upon receiving the message from host 410, computing resource 415 processes the message and implements the message accordingly. For example, computing resource 415 may implement the parameters relative to each tenant indicated in the message. In some examples, one or more tenants (e.g., VM 455) may be accessing computing resource 415 continuously. However, to reach computing resource 415, the one or more tenants go through virtual functions that are different or separate from a control function (e.g., PF0) host 410 uses to communicate the message to computing resource 415. Accordingly, the one or more tenants are not aware of the control path accesses of computing resource 415. As a result, some performance transients may be associated with host 410 sending the message to computing resource 415 and/or with computing resource 415 processing the message.

Computing resource 415 then attempts to maintain the multitenancy performance settings as requested. For example, computing resource 415 tries to meet the requested behavior of all the tenants based on various shared resources of computing resource 415. It is noted that some computing resources may receive and understand the contents of the message from host 410 (e.g., computing resource 415), but some computing resources may not be capable of providing the requested parameters or fully providing the requested parameters. Accordingly, host 410 may adjust parameters based on the levels of performance received by each tenant. In examples, parameters that may be adjusted may include at least one of reserve, limit, arbitration strength (e.g., which may be proportional to each tenant's limit value), IO consistency values per read command group, write command group, other command group, real-time service categories, and/or the like.

In some examples, host 410 may apply a library of capabilities to provide a variety of types of tenant traffic. In some cases, computing resource 415 may be considered a terminal or end point in a given network. Computing resource 415 may be configured to maintain an access contract by implementing access policing (e.g., policing tenant's access to computing resource 415). In some cases, computing resource 415 may implement a leaky bucket algorithm for implementing access policing and/or other similar tokening algorithms. Additionally, or alternatively, computing resource 415 may implement a generic cell rate algorithm (GCRA) algorithm for implementing access policing.

When host 410 configures access for a tenant (e.g., VM 455), the message from host 410 may indicate to computing resource 415 the type of service being requested (e.g., level of service, relatively high data rate service, relatively low data rate service, etc.), the parameters of each data flow in both directions, and/or the quality of service (QOS) parameters requested in each direction. These parameters can form at least a portion of a communication descriptor (e.g., access descriptor) for the connection. These service categories can provide a method to relate access characteristics and QoS requirements to computing resource 415. The service categories can be characterized as being real-time or non-real-time. The real-time service categories can include at least one of constant bit rate (CBR) and/or real-time variable bit rate (rt-VBR). The non-real-time service categories can include unspecified bit rate (UBR), adaptive bit rate (ABR), and/or non-real-time variable bit rate (nrt-VBR). In some examples, the service categories may be communicated in the context of GCRA parameters. Thus, when a drive implements another algorithm that mimics GCRA, the success or failure of that implementation can be compared to a simplistic GCRA implementation for conformance. Accordingly, the access policing of computing resource 415 may provide networking standards for communicating QoS requests from a host (e.g., host 410) to computing resource 415.

As shown, computing resource 415 may provide dual port access via port 420 and port 425. Accordingly, computing resource 415 may provide Active-Active usage by two distinct hosts without assuming coordination between the hosts. In some examples, two storage heads (e.g., host 405 and host 410) may operate independently in Active-Active dual port sharing based on the dual port access of an SSD (e.g., computing resource 415). In some cases, the two storage heads may agree to use non-overlapping LBA ranges of the SSD, but each storage head may access the SSD through a different port (e.g., port 420 and port 425, respectively). In some cases, the two storage heads may be assigned a separate RUH (e.g., RUH 310) or separate set of RUHs (e.g., RUH 310, RUH 315, etc.), where each port provides equal or balanced access to the SSD.

As shown, port 425 may provide PCIe functions (e.g., physical function 430, virtual function 435, and/or virtual function 440). The functions of port 425 may provide tenants access (e.g., dedicated access, shared access) to the functions of computing resource 415. In some cases, each VM of host 410 (e.g., VM 455) may be associated with a port and/or function of computing resource 415. In some cases, a VM may be assigned its own virtual function (e.g., VM 455 assigned exclusive or shared access to virtual function 435). In some cases, some VMs may share backend identifiers such as RUH (e.g., RUH 320), while some VMs may have exclusive access to an RUH.

In some cases, submission queues (SQs) of tenants that are identified may be created within specific virtual functions (VFs) of computing resource 415 (e.g., virtual function 435, virtual function 440, etc.). In some examples, VF1 of computing resource 415 may include SQs where host 410 populates reads (e.g., all reads) sent by tenants of host 410. In some cases, VF1 may be assigned a priority (e.g., highest priority). VF2 may be configured to include SQs where host 410 populates writes (e.g., all writes) sent by tenants, where VF2 may be assigned a second highest priority. VF3 may be configured to include SQs where host 410 populates a file system GC read (e.g., all file system GC reads). VF4 may be configured to include SQs where host 410 populates a file system GC write (e.g., all file system GC writes). VF5 may be configured to include SQs where host 410 populates a deallocate (e.g., all deallocates). The configuration of VFs may be based on a persistent key-value store (e.g., RocksDB) and/or a caching engine (e.g., CacheLib, compute/server layer caching). In some examples, priorities may be the arbitration strengths that are set to be relative to each other. The arbitration strength may be based on a relationship of Limit_tenant_1 to Limit_tenant_2. In some cases, tenants may be reassigned to new VFs and/or new arbitration strengths may be assigned to the tenants without changing the VF relationships. In some aspects, Tenant 1's win rate may be based on BW_arb_weight_1/(BW_arb_weight_2+BW_arb_weight_1), where "BW_arb_weight" refers to bandwidth arbitration weight. In some cases, Tenant 1's win rate may be based on BW_arb_weight_1/(sum of all BW_arb_weights of all active tenants). In some cases, determining Tenant 1's win rate may be based on active tenants because doing so removes from the calculation any tenants that have weights provided by the host in the settings file, but that are not currently sending commands to the SSD actively.

Figure 5:
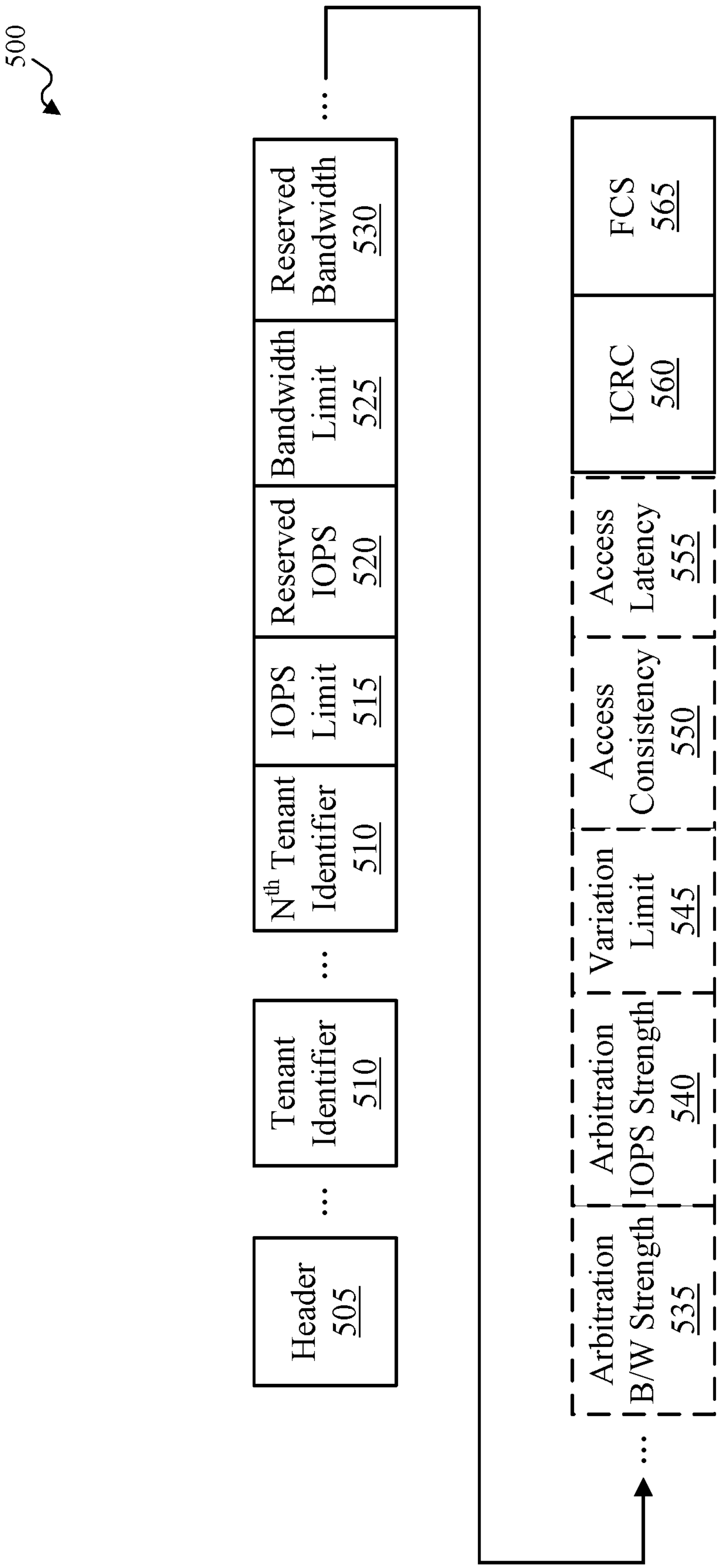
FIG. 5 illustrates a packet format in accordance with one or more implementations as described herein.

FIG. 5 illustrates a message 500 in accordance with one or more implementations as described herein. In some cases, message 500 may be a message or a packet for configuring tenants (e.g., a message host 410 sends computing resource 415 for configuring tenant access to computing resource 415). In some examples, message 500 includes one or more fields. In some cases, a format of message 500 may be based on a format of non-volatile memory express packets (e.g., NVMe's set features command).

In the illustrated example, the fields of message 500 may include at least one of header 505, tenant identifier 510 (e.g., up to N tenant identifiers), IOPS limit 515, reserved IOPS 520, bandwidth limit 525, reserved bandwidth 530, invariant CRC (ICRC) 560, and/or frame check sequence (FCS) 565. Additionally, alternatively, the fields of message 500 may include at least one of arbitration bandwidth strength 535, arbitration IOPS strength 540, variation limit 545, access consistency 550, and/or access latency 555.

In some examples, the field for IOPS limit 515 may include an indication (e.g., one or more bit values) for a maximum allowed input output operations per second (IOPS) on the computing resource for a tenant identified in the field for tenant identifier 510. The field for reserved IOPS 520 may include an indication for a reserved level of IOPS on the computing resource for the tenant. In some cases, the field for bandwidth limit 525 may include an indication for a maximum available communication bandwidth between the tenant and the computing resource. The field for reserved bandwidth 530 may include an indication for a reserved level of communication bandwidth between the tenant and the computing resource.

In some cases, the field for arbitration bandwidth strength 535 may include an indication for a proportional bandwidth win rate of the tenant relative to a bandwidth win rate of at least one other tenant. For example, when a first tenant and a second tenant are competing for at least a portion of bandwidth of the same computing resource (e.g., same RUH such as RUH 310, same RG such as RG 325, same RU such as RU 345*b*, same processing resource, same memory resource, etc.), the computing resource may resolve the conflict by determining whether first tenant is assigned a higher bandwidth strength than the second tenant. In some examples, an absolute target value may be implemented. The sum of all absolute target values of the tenants may be used to sum to less that the capabilities of the drive. The absolute target value can be put where proportional win rate is implemented. In some cases, a drive may limit a tenant to not exceed the target value. In some aspects, Tenant 1's win rate may be based on BW_arb_weight_1/(BW_arb_weight_2+BW_arb_weight_1), where "BW_arb_weight_1" may refer to bandwidth arbitration weight of Tenant 1, etc. In some cases, Tenant 1's win rate may be based on BW_arb_weight_1/(sum of all BW_arb_weights of all active tenants). In some cases, determining Tenant 1's win rate may be based on active tenants because doing so removes from the calculation any tenants that have weights provided by the host in the settings file, but that are not currently sending commands to the SSD actively.

When the computing resource determines that the first tenant is assigned a higher bandwidth strength than the second tenant (e.g., assigned a higher bandwidth priority), then the computing resource may block or throttle the second tenant and permit the first tenant to use the bandwidth. In some cases, the computing resource may allow the first tenant to use the bandwidth first and for a first set amount of time based on the bandwidth strength of the first tenant, before allowing the second tenant to use the bandwidth for a second set amount of time that may be lower than the first set amount of time.

The field for arbitration IOPS strength 540 may include an indication for a proportional IOPS win rate of the tenant relative to an IOPS win rate of the at least one other tenant. For example, when the computing resource determines that a first tenant is assigned a higher IOPS strength than a second tenant (e.g., assigned a higher IOPS priority), then the computing resource may block the second tenant and permit the first tenant to use the bandwidth. In some cases, the computing resource may allow the first tenant to use a first number of IOPS first based on the IOPS strength of the first tenant, before allowing the second tenant to use a second number of IOPS that may be lower than the first number of IOPS. In some aspects, Tenant 1's IOPS win rate may be based on IOPS_arb_weight_1/(sum of all IOPS_arb_weights of all active tenants), where "IOPS_arb_weight_1" may refer to the IOPS arbitration weight of Tenant 1.

In some cases, the field for variation limit 545 may include an indication for a maximum level of variation in access to the computing resource over a time period. For example, variation limit 545 may indicate per tenant how much access to the computing resource and/or performance received from the computing resource can vary for a given time period. The field for access consistency 550 may include an indication for an access consistency level between the tenant and the computing resource. For example, access consistency 550 may indicate per tenant how consistent access to the computing resource and/or performance received from the computing resource ought to be over a given time period. In some cases, access consistency 550 may be based on a completion time of each command. In some cases, command durations may be placed into bins and a histogram and/or probability density function (PDF) may be generated based on the bin values. In some cases, consistency may be plotted or evaluated as a cumulative distribution function (CDF) and/or exceedance plot.

The field for access latency 555 may include an indication for a maximum allowed access latency between the tenant and the computing resource. For example, access consistency 550 may indicate per tenant how much latency can occur in access to the computing resource and/or performance received from the computing resource. The field for access latency may include an indication for a target maximum allowed latency for a percent of commands. If the host communicated a target latency of 10 ms for 99.99% of commands, then the host may be requesting that only 1 out of 10,000 commands over a measurement period (e.g., 10 minutes) may exceed the 10 ms target.

In some cases, ICRC field 560 can be configured to include a value (e.g., a 32-bit value) that covers one or more fields of message 500 (e.g., all fields of message 500) that do not change as message 500 travels from a source port to a destination port. ICRC field 560 can be generated by a link layer of a source port associated with message 500.

When a host configures access for a tenant to a computing resource, the host may send a message to computing resource based on message 500. The message from the host may indicate to the computing resource the type of service being requested (e.g., level of service, relatively high data rate service, relatively low data rate service, etc.), the parameters of each data flow in both directions, and/or the quality of service (QOS) parameters requested in each direction. The parameters may be communicated via one or more fields such as IOPS limit 515, reserved IOPS 520, bandwidth limit 525, reserved bandwidth 530, arbitration bandwidth strength 535, arbitration IOPS strength 540, variation limit 545, access consistency 550, and/or access latency 555.

In some examples, the parameters indicated in message 500 can form at least a portion of a communication descriptor (e.g., access descriptor) for a tenant. The parameters can provide a method to relate access characteristics and/or QoS requirements to the computing resource. In some cases, the value in tenant identifier 510 may include one or more front end identifiers and/or one or more back end identifiers to identify tenants. Interface or front end identifiers may include at least one component of a computing resource, such as a port, physical functions, virtual functions, NVM controller, SQs, command types, LBA ranges, streams, RUHs (e.g., RUH 310, RUH 315, etc., of endurance group 305), zones, sIOV, GPU, portion of GPU cores, FPGA, and/or computational storage threads. Back end identifiers (e.g., NAND identifiers based on an SSD computing resource) may include at least one component of a computing resource, such as a namespace, endurance groups, RGs, RUHs, Zones, Streams, command types, and/or command IDs. In some cases, any combination of front end and/or back end identifies may be used to identify a tenant. In some examples more than one identifier may be used. This might be useful when arbitrating DRAM access or compute resource allocations.

In some examples, a storage computing resource (e.g., SSD) may be configured to use the arbitration bandwidth strength 535 and/or arbitration IOPS strength 540 to interleave NAND management activities during steady state (e.g., for internal maintenance of the computing resource). In some cases, a host may identify such internal operations (e.g., via control path PF0), providing the host improved visibility of the sources of performance variations. In some cases, variations may be measured based on Y performance for X time. This measurement can be repeated, and the change in a first instance of Y1, in a second instance of Y2, etc. In some cases, peak deviations away from the average may be quantified based on performance limits.

For a storage computing resource (e.g., SSD), writes, reads, and deallocates travel different paths to the computing resource. In some cases, reads and writes may arbitrate for NAND access. In some cases, deallocates and writes may arbitrate for DRAM access (e.g., SSD DRAM). A request from a host of partitioning X %, Y %, and Z % among these three command types to different tenants (e.g., 20% to reads, 50% to writes, 30% to deallocation) may be modified when only two command types are trying to access (e.g., when only reads and deallocation, 20% reads modified to 40% reads and 30% deallocation modified to 60%).

Figure 6:
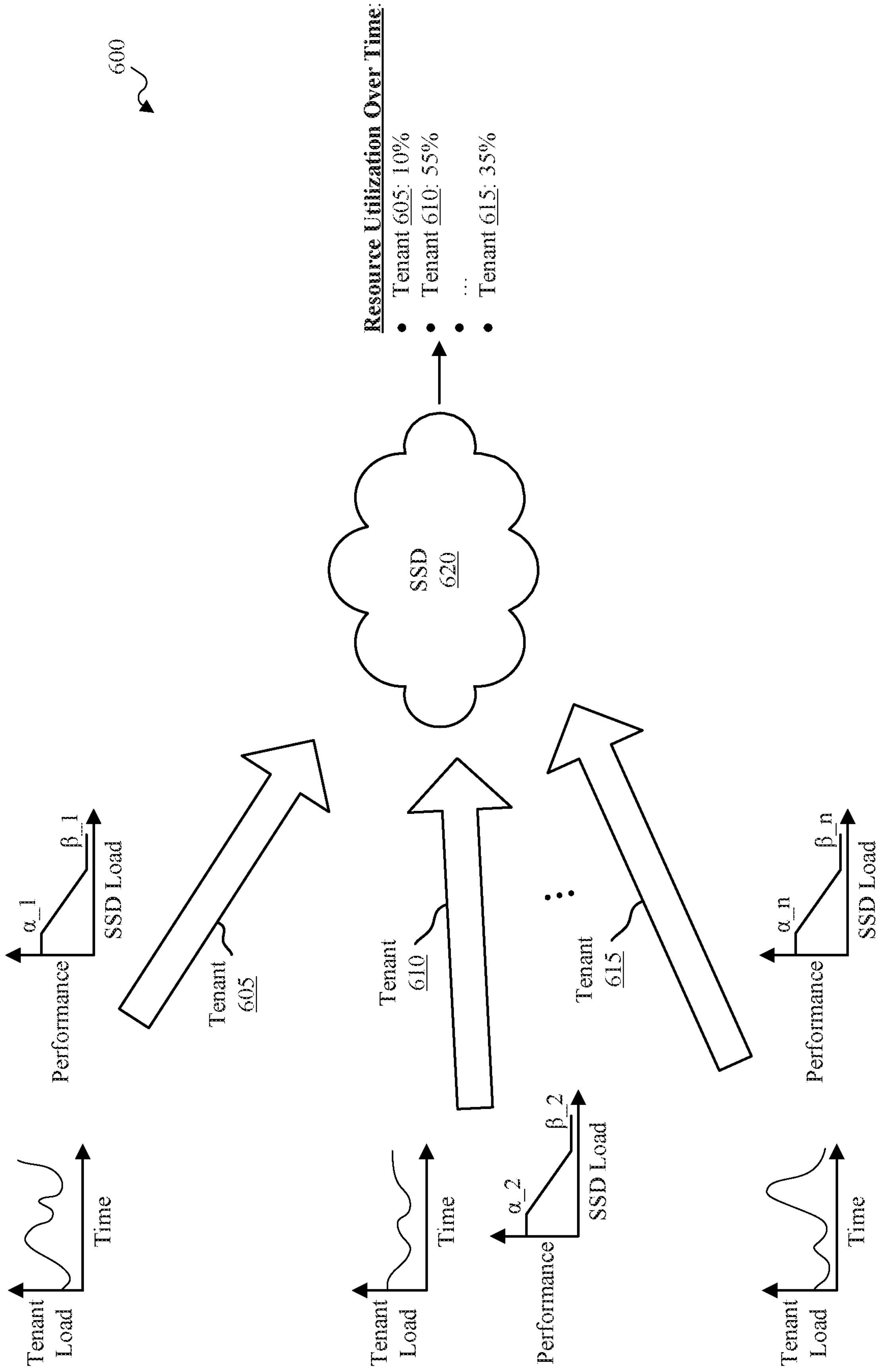
FIGS. 6-11 illustrate example systems in accordance with one or more implementations as described herein.

FIG. 6 illustrates an example system 600 in accordance with one or more implementations as described herein. System 600 may represent multiple tenants accessing a computing resource (e.g., a storage computing resource). As shown, system 600 includes tenant 605, tenant 610, tenant 615 (e.g. N tenants where tenant 615 is the Nth tenant), and SSD 620 (e.g., a computing resource such as computing resource 415).

In the illustrated example, tenant 605 may be associated with a first tenant load over time in relation to a first performance level and SSD load, tenant 610 may be associated with a second tenant load over time in relation to a second performance level and SSD load, and tenant 615 may be associated with an Nth tenant load over time in relation to an Nth performance level and SSD load. In some cases, tenant load may be a function of current queue depth and command length of a given tenant at a given time. In some aspects, WAF of a given tenant may be estimated based on a filter, time-weighted average, or other technique. In some aspects, each command may have a number of LBAs (e.g., number of logical blocks (NLB)) in a command descriptor (e.g., submission queue entry (SQE)). Command length for each command may be NLB for that command. In some cases, each tenant may use one or more submission queues (SQs) for submitting commands for the SSD to work on. A QD may be defined as the number of commands outstanding to the SSD in all of these SQs. For example, a tenant's total QD may equal the sum of (QD per SQ).

In the illustrated example, the first performance level and SSD load may be based on limit $\alpha_1$ (e.g., arbitration weights of IOPS limit and/or bandwidth limit) and reservation $\beta_1$ (e.g., reserved IOPS, reserved bandwidth) for tenant 605, the second performance level and SSD load may be based on limit $\alpha_2$ and reservation $\beta_2$ for tenant 610, and the Nth performance level and SSD load may be based on limit $\alpha_n$ and reservation $\beta_n$ for tenant 615. For example, host 410 may send at least one message (e.g., message 500) to computing resource 415. In some cases, one or more fields of the at least one message may include at least one of limit $\alpha_1$, reservation $\beta_1$, limit $\alpha_2$, reservation $\beta_2$, limit $\alpha_n$, and/or reservation $\beta_n$.

In some cases, SSD 620 may make arbitration decisions based on the respective IOPS limits and reserved bandwidths. In some cases, arbitration by SSD 620 may be based on implementing reservations to protect resource capabilities of SSD 620, utilization of a resource of SSD 620 per tenant over time, removing tenants without commands in flight (no queue depth) from a given resource's arbitration (e.g., idle or read only tenants do not need to arbitrate for write resources), QoS controlled through reservation, and/or allowed (e.g., maximum) resource utilization (e.g., IOPS, bandwidth, etc.) controlled through arbitration weight (e.g., IOPS limit and/or bandwidth limit). A limit value may indicate to the SSD that the tenant is not allowed to go above the limit value. Limit value for IOPS and bandwidth may be independently assigned. A reserve value may indicate to the SSD that a tenant requesting SSD capabilities below the reserve value (e.g., of IOPS or of bandwidth) is to always get access to that resource. An arbitration weight may indicate to the SSD that when a resource is in contention by two tenants (e.g., two or more tenants), then the arbitration weight between the two tenants will be compared. Based on the win ratio of each tenant, the SSD is requested to attempt to approximate the ratio of the arbitration weights in a steady state measure.

Based on the multitenancy parameter configurations for each tenant (e.g., limit on IOPS and/or bandwidth, reservation on IOPS and/or bandwidth), tenant 605 may use 10% of the resources of SSD 620 over a given time period, tenant 610 may use 55% of the resources of SSD 620 over the time period, and tenant 615 may use 35% of the resources of SSD 620 over the time period. In some cases, a host (e.g., host 410) may determine whether the respective resource utilization over time aligns with the multitenancy parameter configurations for each tenant. In some cases, the host may update the multitenancy parameter configuration for at least one tenant when the host determines the resource utilization of at least one tenant does not align with the respective multitenancy parameter configurations.

In some cases, the various settings (e.g., limit $\alpha$, reservation $\beta$, etc.) can be relative between tenants. For example, a host may assign various settings to the tenants of that host relative to a performance level assigned to each host. In some cases, a host may monitor the arbitration success rates of different tenants. It is noted that for an IOPS read command group for tenant 1 there may be a requested reserve, limit, IO consistency, and/or arbitration strength. For a bandwidth read command group for tenant 1, there may be a requested reserve, limit, IO consistency, and/or arbitration strength. For an IOPS write command group for tenant 1, there may be a requested reserve, limit, IO consistency, and/or arbitration strength. For bandwidth write command group for tenant 1, there may be a requested reserve, limit, IO consistency, and/or arbitration strength. For an IOPS other command group for tenant 1, there may be a requested reserve, limit, IO consistency, and/or arbitration strength. For a bandwidth other command group for tenant 1, there may be a requested reserve, limit, IO consistency, and/or arbitration strength.

In some examples, monitoring may be based on an overall aggregate of IOPS and/or bandwidth, per command type or category, etc. Actions that SSD 620 may take include temporary adjustments (e.g., increase, decrease) in limit or reservation behavior of a given tenant, permanent adjustment in limit or reserve behavior, implement bounded or unbounded variations impacting another tenant, adjust arbitration settings per tenant, break relatively large commands into smaller commands and/or larger packets, increase arbiter cycle, alter arbiter token quantization, change the arbiter type, etc. In some examples, a shortage in tokens may trigger the one or more actions that SSD 620 may take. In some cases, SSD 620 may increase allowable program/erase suspends. In some examples, SSD 620 may defer internal SSD activities such as metadata logging, NAND management, etc., based on bursty behavior of tenants, deferring the internal SSD activities until the bursty behavior subsides. In some cases, SSD 620 may implement a bypass operation (e.g. based on settings received from the host and/or based on SSD configuration) to allow a hardware block to jump to the head-of-the-line-blocking. In some cases, SSD 620 may implement a custom arbitration mode for arbitrating a resource.

Figure 7:
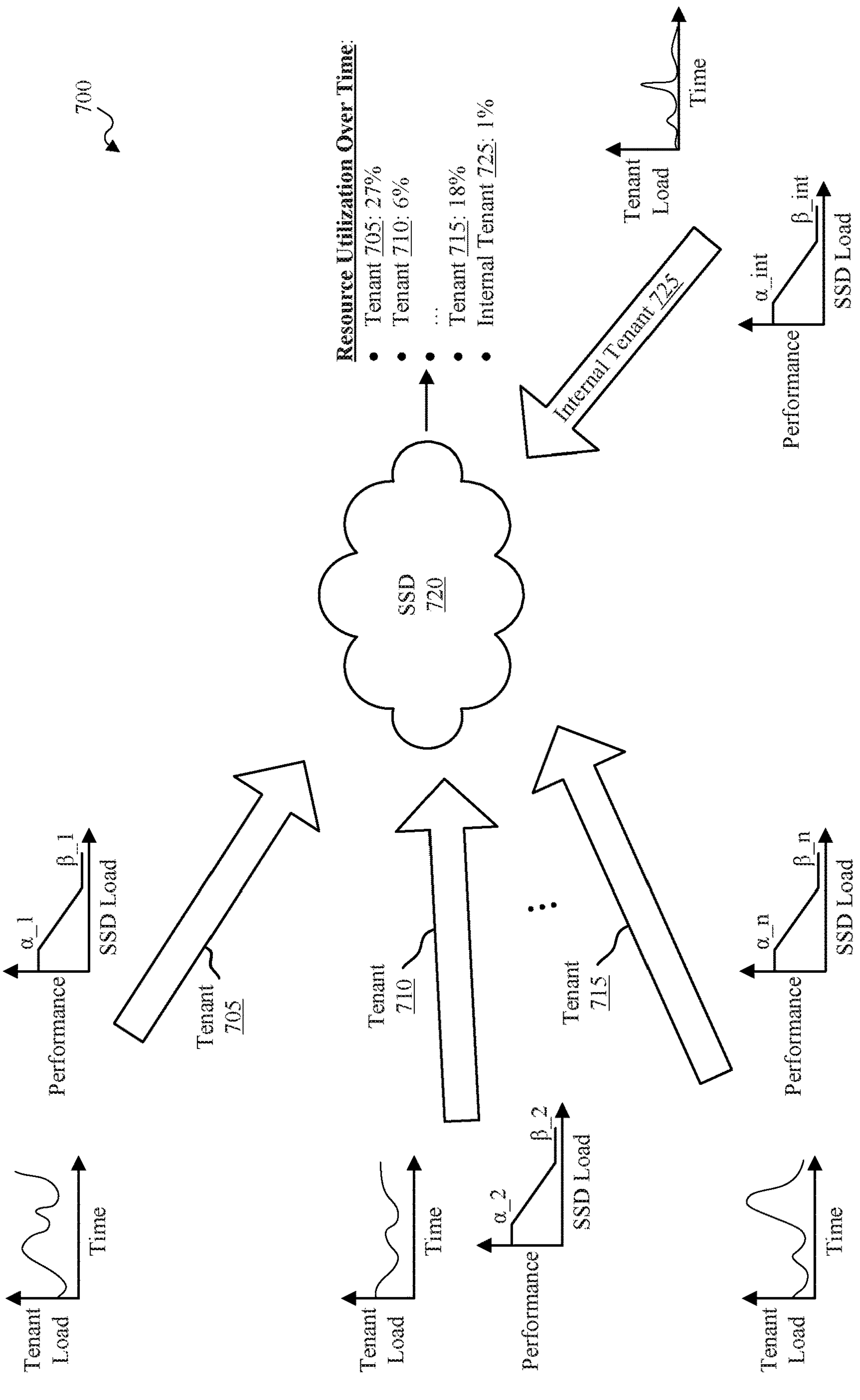

FIG. 7 illustrates an example system 700 in accordance with one or more implementations as described herein. System 700 may represent multiple tenants accessing a computing resource (e.g., a storage computing resource). As shown, system 700 includes tenant 705, tenant 710, tenant 715 (e.g. N tenants where tenant 715 is the Nth tenant), SSD 720 (e.g., a computing resource such as computing resource 415), and internal tenant 725. In some cases, SSD 720 may include one or more internal tenants (e.g., internal tenant 725) to monitor and/or manage internal SSD operations (e.g., for internal maintenance of SSD 720).

As shown, similar to tenant 705, tenant 710, and tenant 715, internal tenant 725 may be associated with an internal tenant load over time in relation to an internal performance level and SSD load. As shown, the internal performance level and SSD load may be based on limit $\alpha$_int (e.g., arbitration weights of IOPS limit and/or bandwidth limit) and reservation $\beta$_int (e.g., reserved IOPS, reserved bandwidth) for internal tenant 725.

In some examples, SSD 720 may be configured with internal tenant 725 to provide control, logging, and/or system behavior information of SSD 720 to one or more hosts. Internal tenant 725 may be configured for NAND management activities such as read patrol, write refresh, handling NAND bugs, SSD controller meta data (e.g., logical to physical (L2P) logging, firmware updates, etc.), etc. In some cases, SSD 720 may provide minimum resource allocation to internal tenant 725 (e.g., an allocation based on estimated end-of-life or worst-case requirement for SSD activities that are not attributable or related to the host IOs or host tenants).

In some cases, the demand of internal tenant 725 can be based on NAND management activities read patrol, closing an erase block that is open too long and risking losing data, testing stored data reliability, latency tests on NAND behaviors (e.g., programs taking longer/shorter compared to expectations), SSD metadata storing, power fail protection activities, and the like. In some cases, a host and/or SSD 720 may allow this activity to occur as a function of the arbitration win rates determined by the settings of an arbitration engine of the host and/or SSD 720. In some cases, submission queue (SQ) arbitration may not be impacted when internal tenant 725 does not insert SQ entries. However, DRAM accesses may implement the arbitration policy based on internal needs to update SuperBlock tracking information or powerfail readiness for the L2P table or GC vs incoming buffer management.

In some examples, a host may adjust the arbitration strength (e.g., IOPS limit, bandwidth limit) for internal tenant 725 based on circumstances of one or more tenants and/or SSD 720. A higher arbitration strength for internal tenant 725 may imply SSD 720 should work ahead on background internal tasks as much as possible. In some cases, higher arbitration strength settings for internal tenant 725 may be used as a mechanism to improve latency of SSD 720. In some cases, lower arbitration strength for internal tenant 725 may imply that SSD 720 should assume the workloads of tenants are bursty (e.g., times of high tenant loads and low tenant loads). Accordingly, SSD 720 may determine to defer at least some internal activity, improving QoS for the host tenants. However, deferring for too long risks SSD 720 reaching a critical threshold where internal activities are mandatory, which can degrade performance of host tenants. In some cases, a host and/or SSD 720 may adjust the arbitration setting for internal tenant 725 to interleave NAND management activities during steady state.

In some examples, internal tenant 725 can be used to set the arbitration rate request within a multitenant or QoS environment. In some example, a Host may be allowed to set internal tenant behaviors. In the case that the host sets a level relatively high, the host may be encouraging the drive to get ahead on internal activity. In the case where the host sets a level it relatively low, the host may be requesting the drive defer internal activity to improve the I/O consistency and/or latency. Additionally, or alternatively, internal tenant 725 can be used to manipulate when internal SSD activities occur (defer them, accelerate them, execute immediately). For example, internal tenant 725 may execute the internal SSD activities, defer them, or accelerate them, thus improving SSD IO consistency and latency. Additionally, or alternatively, internal tenant 725 can be used to manipulate SSD IO consistency or latency of SSD 720.

Based on the multitenancy parameter configurations for each tenant (e.g., limit on IOPS and/or bandwidth, reservation on IOPS and/or bandwidth), tenant 705 may use 27% of the resources of SSD 720 over a time period, tenant 710 may use 6% of the resources of SSD 720 over the time period, tenant 715 may use 18% of the resources of SSD 720 over the time period, and internal tenant 725 may use 1% of the resources of SSD 720 over the time period. In some cases, a host (e.g., host 410) may determine whether the respective resource utilization over time aligns with the multitenancy parameter configurations for each tenant. In some cases, the host may update the multitenancy parameter configuration for at least one tenant when the host determines the resource utilization of at least one tenant does not align with the respective multitenancy parameter configurations.

Figure 8:
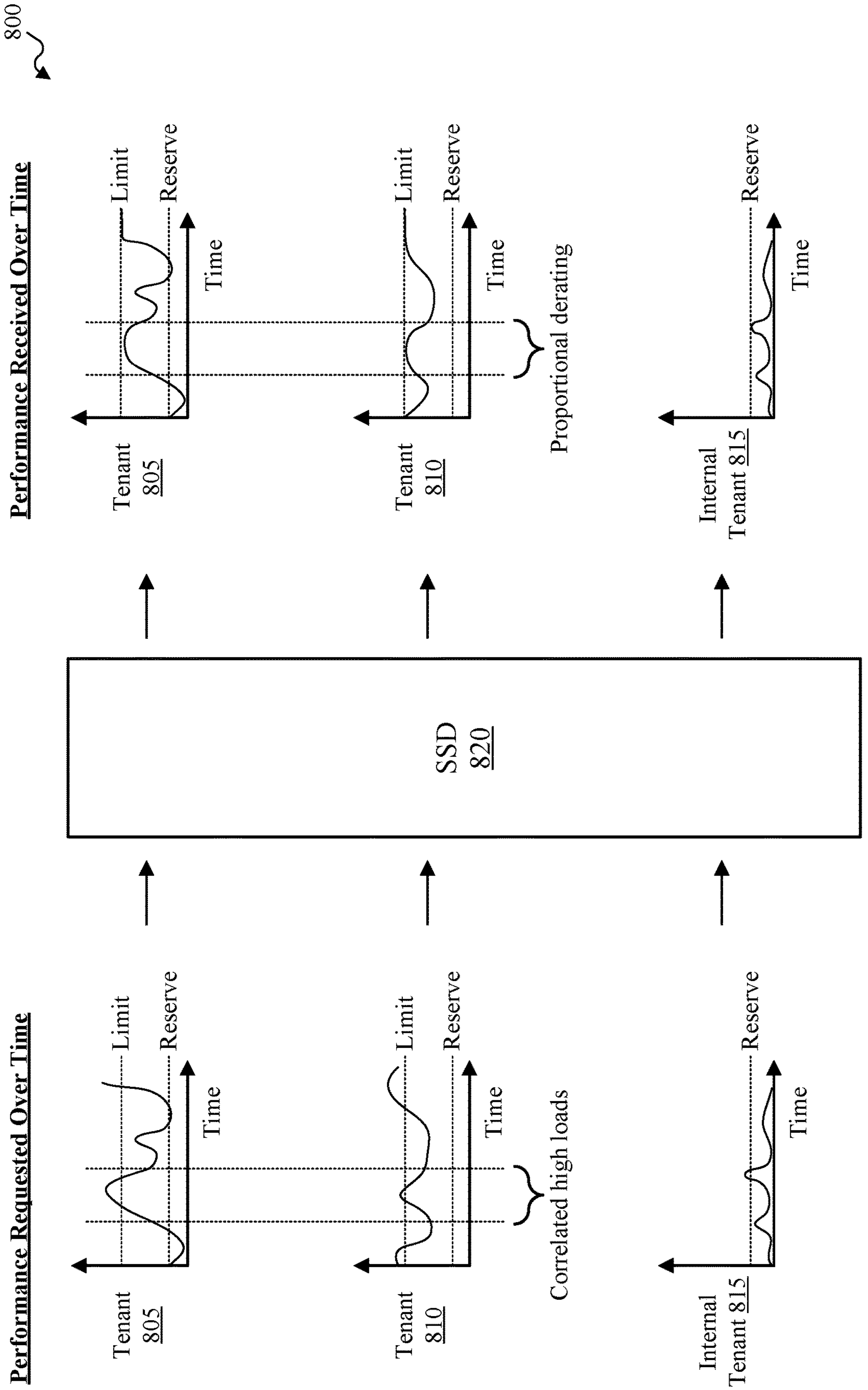

FIG. 8 illustrates an example system 800 in accordance with one or more implementations as described herein. System 800 may represent multiple tenants accessing a computing resource (e.g., a storage computing resource). As shown, system 800 includes tenant 805, tenant 810, internal tenant 815, and SSD 820 (e.g., a computing resource such as computing resource 415). In some cases, SSD 820 may include one or more internal tenants (e.g., internal tenant 815) to monitor and/or manage internal SSD operations (e.g., for internal maintenance of SSD 820).

In some examples, SSD 820 may be configured with internal tenant 815 to provide control, logging, and/or system behavior information of SSD 825 to one or more hosts. Internal tenant 815 may be configured for NAND management activities such as read patrol, write refresh, handling NAND bugs, SSD controller meta data (e.g., logical to physical (L2P) logging, firmware updates, etc.), etc. In some cases, SSD 820 may provide minimum resource allocation to internal tenant 815.

In some examples, tenant 805, tenant 810, and internal tenant 815 may be configured with one or more multitenancy configuration parameters. As shown, tenant 805 may be associated with a first limit and first reserve (e.g., first performance limit on IOPS and/or bandwidth, first performance reservation on IOPS and/or bandwidth) relative to its tenant load over time, tenant 810 may be associated with a second limit and second reserve relative to its tenant load over time, and internal tenant 815 may be associated with an internal reserve (e.g., but not an internal limit) relative to its tenant load over time. In some examples, the host may use a command to set the first limit and/or the first reserve. In some cases, the command may be formatted with a field for each of the values (e.g., first limit, first reserve). In some cases, the command may include fields for reserve, limit, arbitration strength, and/or I/O consistency (e.g., fields for multiple RG/RUH combinations). In some cases, the command may configure a NAND associated with a read command group with first settings for reserve, limit, I/O variation, and/or arbitration weight, configure a NAND associated with a write command group with second settings for reserve, limit, I/O variation, and/or arbitration weight, and configure a NAND associated with other command group with third settings for reserve, limit, I/O variation, and/or arbitration weight. As shown, tenant 805 may receive a first level of performance from SSD 820 based on the first limit and/or first reserve, tenant 810 may receive a second level of performance from SSD 820 based on the second limit and/or second reserve, and internal tenant 815 may receive an internal level of performance from SSD 820 based on the internal reserve.

In the illustrated example, SSD 820 may use the respective reserve parameters of the tenants to protect availability of the resources of SSD 820 for top tier tenants (e.g., for highest priority tenants). In some examples, a host may set performance levels and communicate, respective to each tenant, a performance level request to the SSD for the SSD to uphold. Highest priority tenants may have higher limits, higher reserves, tighter I/O variation requirements, and/or higher arbitration weights than lower priority tenants. In some cases, SSD 820 may use the respective reserve parameters of the tenants to generally increase the availability of SSD 820 (e.g., make SSD 820 more idle, make SSD 820 more consistent in performance across tenants). In some aspects, a host may set performance levels and communicate, respective to each tenant, a performance level request to the SSD for the SSD to uphold. Other tenants may be lowered on their limit values, reserves, etc., resulting in another tenant increasing performance relatively. In some cases, I/O variation requirement settings may be tightened, and arbitration weight for a tenant may be increased. In some examples, respective parameters may be used based on IOPS and/or bandwidth per VF, RUH, etc. In some cases, SSD 820 may use the respective limit parameters of the tenants to maintain general consistency among the tenants, to maintain performance latencies within expected margins, and/or to maintain relative performance levels from tenant to tenant.

In some examples, SSD 820 may implement proportional derating of one or more tenants. For example, SSD 820 may reduce limits and/or reduce reserved performance of one or more tenants during correlated high tenant load times. As shown, the performance demands of tenant 805 and tenant 810 may each exceed their respective limits at the same time (e.g., correlated high loads). Accordingly, SSD 820 may reduce the limit and/or reduce the reserved performance of tenant 805 and/or tenant 810 during the correlated high tenant load time.

When the performance requested by a tenant exceeds its assigned limit (e.g., tenant 805 and/or tenant 810), SSD 820 may cap then tenant. As shown, during the correlated high loads of tenant 805 and tenant 810, the performance received is capped on both tenants. In some cases, SSD 820 may allow a tenant to exceed their limit as long as the requested resource of SSD 820 would otherwise go unused. For example, when the performance request of tenant 805 exceeds the limit of tenant 805 and there is not contention with another tenant (e.g., the performance requests of tenant 810 and internal tenant 815 are not in contention with the performance request of tenant 805), then SSD 820 may allow tenant 805 to exceed its assigned limit.

In some examples, the reserve level of one or more tenants may be modified by the host of the tenants and/or SSD 820. In some cases, a performance reservation of one or more tenants may be removed from SSD 820 (e.g., removed as an available capability of SSD 820 relative to one or more tenants), resulting in other tenants not being able to access or utilize the full capability of SSD 820. In some cases, a performance reservation of one or more tenants may be maintained (e.g., not removed) on SSD 820. A given tenant may achieve its reserve relatively quickly if activity ramps from a value previously below the reserve. In some cases, the performance reservation of one or more tenants may be adjusted to modify one or more tenant's variation or latency behaviors. For example, the reserve of tenant 805 may be adjusted to modify the variation or latency behavior of tenant 805 and/or to modify the variation or latency behavior of tenant 810.

Figure 9:
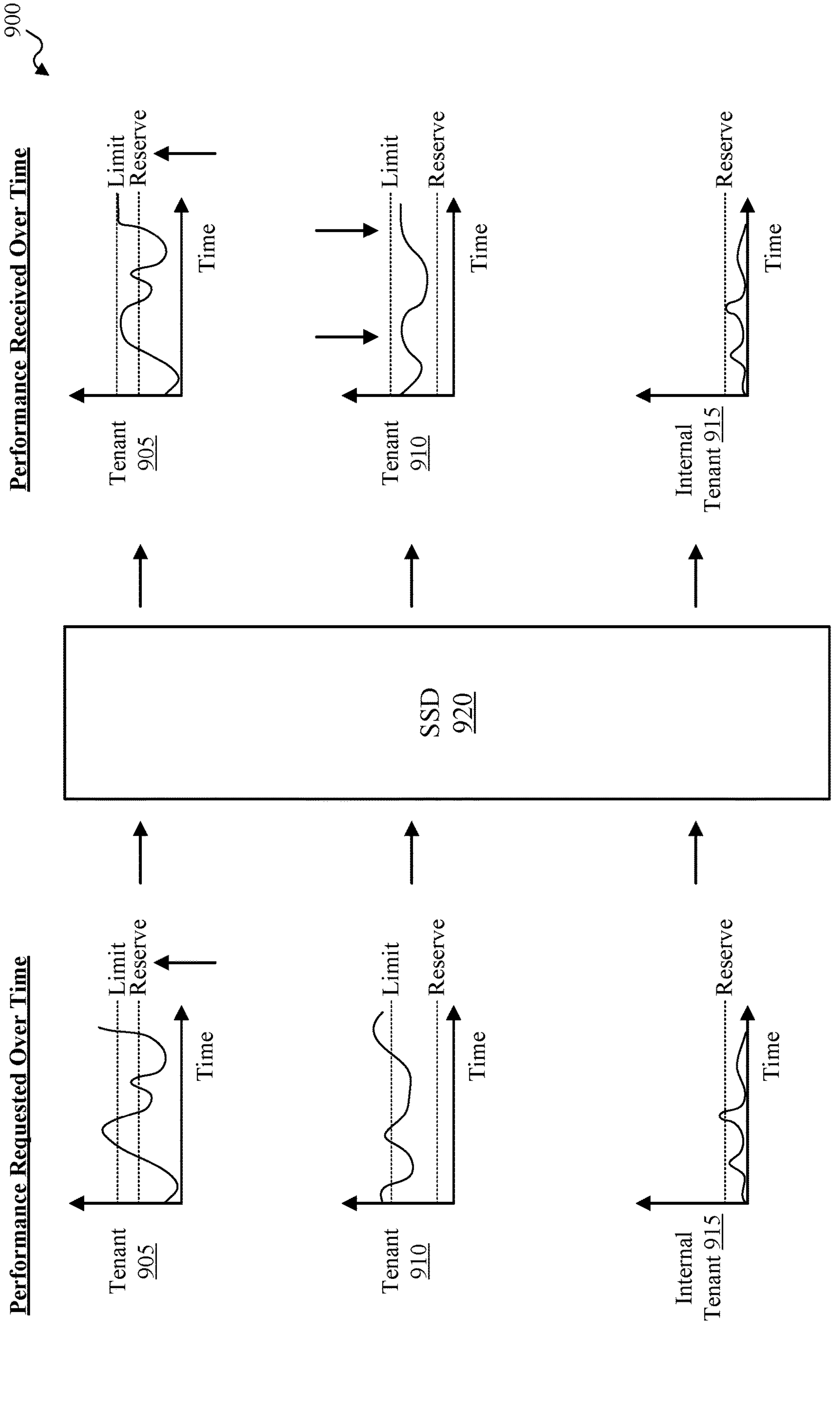

FIG. 9 illustrates an example system 900 in accordance with one or more implementations as described herein. System 900 may represent multiple tenants accessing a computing resource (e.g., a storage computing resource). As shown, system 900 includes tenant 905, tenant 910, internal tenant 915, and SSD 920 (e.g., a computing resource such as computing resource 415). In some cases, SSD 920 may include one or more internal tenants (e.g., internal tenant 915) to monitor and/or manage internal SSD operations (e.g., for internal maintenance of SSD 920).

In some examples, tenant 905, tenant 910, and internal tenant 915 may be configured with one or more multitenancy configuration parameters. As shown, tenant 905 may be associated with a first limit and first reserve relative to its tenant load over time, tenant 910 may be associated with a second limit and second reserve relative to its tenant load over time, and internal tenant 915 may be associated with an internal reserve (e.g., but not an internal limit) relative to its tenant load over time. As shown, tenant 905 may receive a first level of performance from SSD 920 based on the first limit and/or first reserve, tenant 910 may receive a second level of performance from SSD 920 based on the second limit and/or second reserve, and internal tenant 915 may receive an internal level of performance from SSD 920 based on the internal reserve.

In the illustrated example, the reserve setting of tenant 905 may be increased (e.g., by a host of tenant 905 and/or SSD 920). As a result, tenant 910 (e.g., a combination of tenants other than tenant 905 associated with SSD 920) no longer receive as much performance from SSD 920 because the increased reserve setting of tenant 905 protects a level of performance from SSD 920, reducing the performance received by tenant 910. The reduced performance received from tenant 910 (e.g., received by the other tenants) means that the tenant 905 gets the performance it requests with higher reliability. In some cases, a host may use modify reserve settings of a tenant (e.g., increase reserve settings of one or more top-tier, high performance tenants) until the variability and consistency target is achieved for that tenant.

In some approaches, a low priority tenant and a high priority tenant compete for resources and access to an SSD. Based on the systems and methods described herein, tighter control is placed on a lower priority tenant while providing more consistent service for high priority tenants. Also, the systems and methods keep a higher priority tenant within limits to balance load share of SSD 920 among the tenants.

Figure 10:
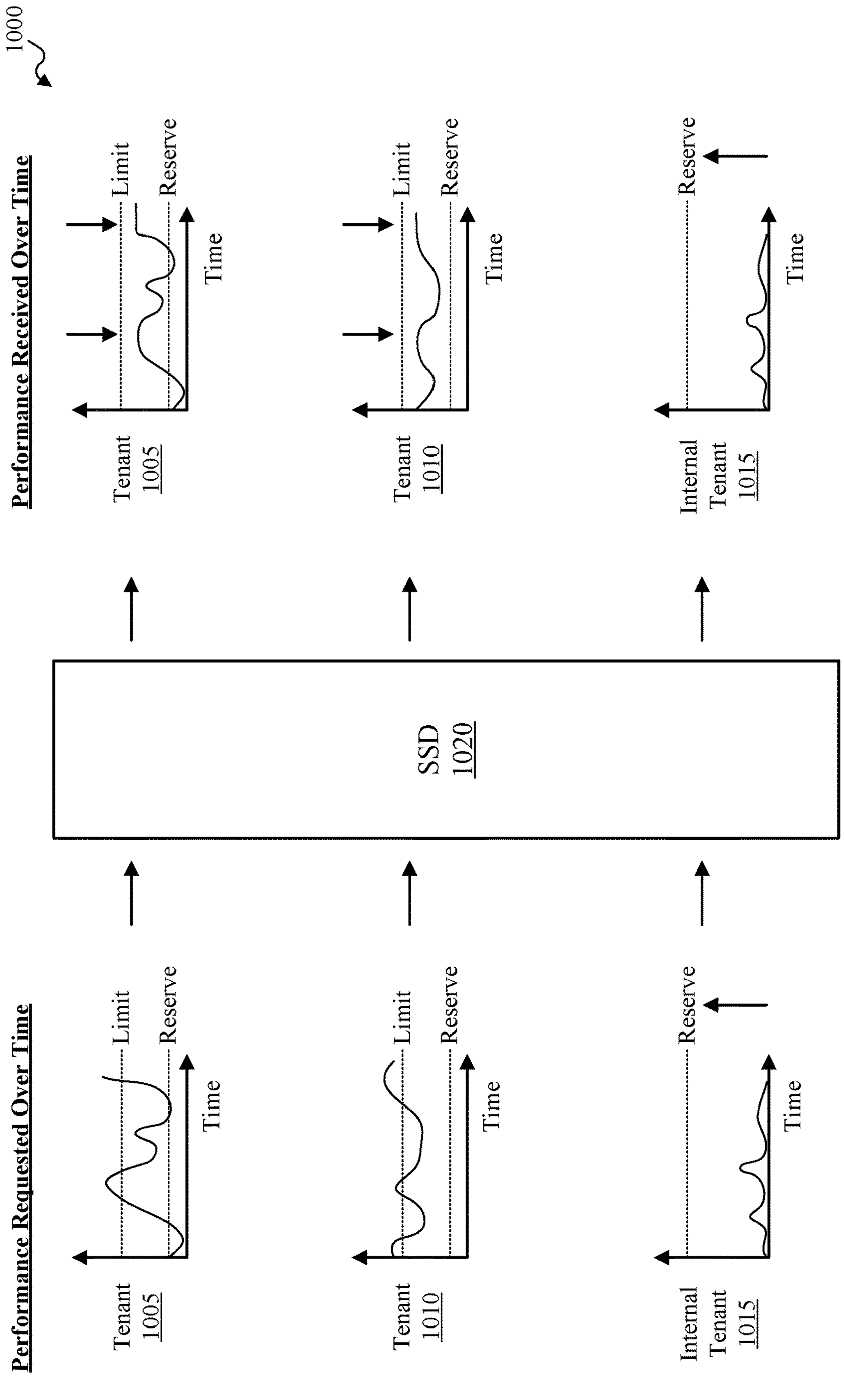

FIG. 10 illustrates an example system 1000 in accordance with one or more implementations as described herein. System 1000 may represent multiple tenants accessing a computing resource (e.g., a storage computing resource). As shown, system 1000 includes tenant 1005, tenant 1010, internal tenant 1015, and SSD 1020 (e.g., a computing resource such as computing resource 415). In some cases, SSD 1020 may include one or more internal tenants (e.g., internal tenant 1015) to monitor and/or manage internal SSD operations (e.g., for internal maintenance of SSD 1020).

In some examples, tenant 1005, tenant 1010, and internal tenant 1015 may be configured with one or more multi-tenancy configuration parameters. As shown, tenant 1005 may be associated with a first limit and first reserve relative to its tenant load over time, tenant 1010 may be associated with a second limit and second reserve relative to its tenant load over time, and internal tenant 1015 may be associated with an internal reserve (e.g., but not an internal limit) relative to its tenant load over time. As shown, tenant 1005 may receive a first level of performance from SSD 1020 based on the first limit and/or first reserve, tenant 1010 may receive a second level of performance from SSD 1020 based on the second limit and/or second reserve, and internal tenant 1015 may receive an internal level of performance from SSD 1020 based on the internal reserve.

In the illustrated example, the reserve setting of internal tenant 1015 may be increased (e.g., by a host of tenant 1005 and/or SSD 1020). As a result, none of the other tenants of SSD 1020 (e.g., tenant 1005, tenant 1010, etc.) are able to get as much performance as they would have before the reserve setting of internal tenant 1015 was increased (e.g., from an internal reserve level similar to the relatively low internal reserve level shown in FIG. 8 and/or FIG. 9). In some examples, a host may control all tenant settings. In some cases, the host may communicate the desired settings for the SSD to uphold for an internal tenant. In this manner, the SSD may provide some internal controls on the activities of the internal tenant.

As shown, the performance received by tenant 1005 and tenant 1010 is reduced based on the reserve setting of internal tenant 1015 being increased. Even if internal tenant 1015 does not use the full performance reserved for it, the performance of host tenants is reduced so that SSD 1020 is capable of providing up to the increased reserve setting of internal tenant 1015 at any given time. Based on the increased reserve setting of internal tenant 1015, bursts in requested performance are moderated downward for host tenants of SSD 1020 (e.g., tenant 1005, tenant 1010, etc.). Based on the increased reserve setting of internal tenant 1015, the performance received by the host tenants is smoother.

In some approaches, a low priority tenant and a high priority tenant compete for resources and access to an SSD. Based on the systems and methods described herein, tighter control on variation is placed on host tenants, but host tenants may be at risk of not getting as much average performance because a portion of the performance SSD 1020 is capable of providing is reserved for internal tenant 1015, even when internal tenant 1015 is not using all of the available performance up to the increased reserve level.

Figure 11:
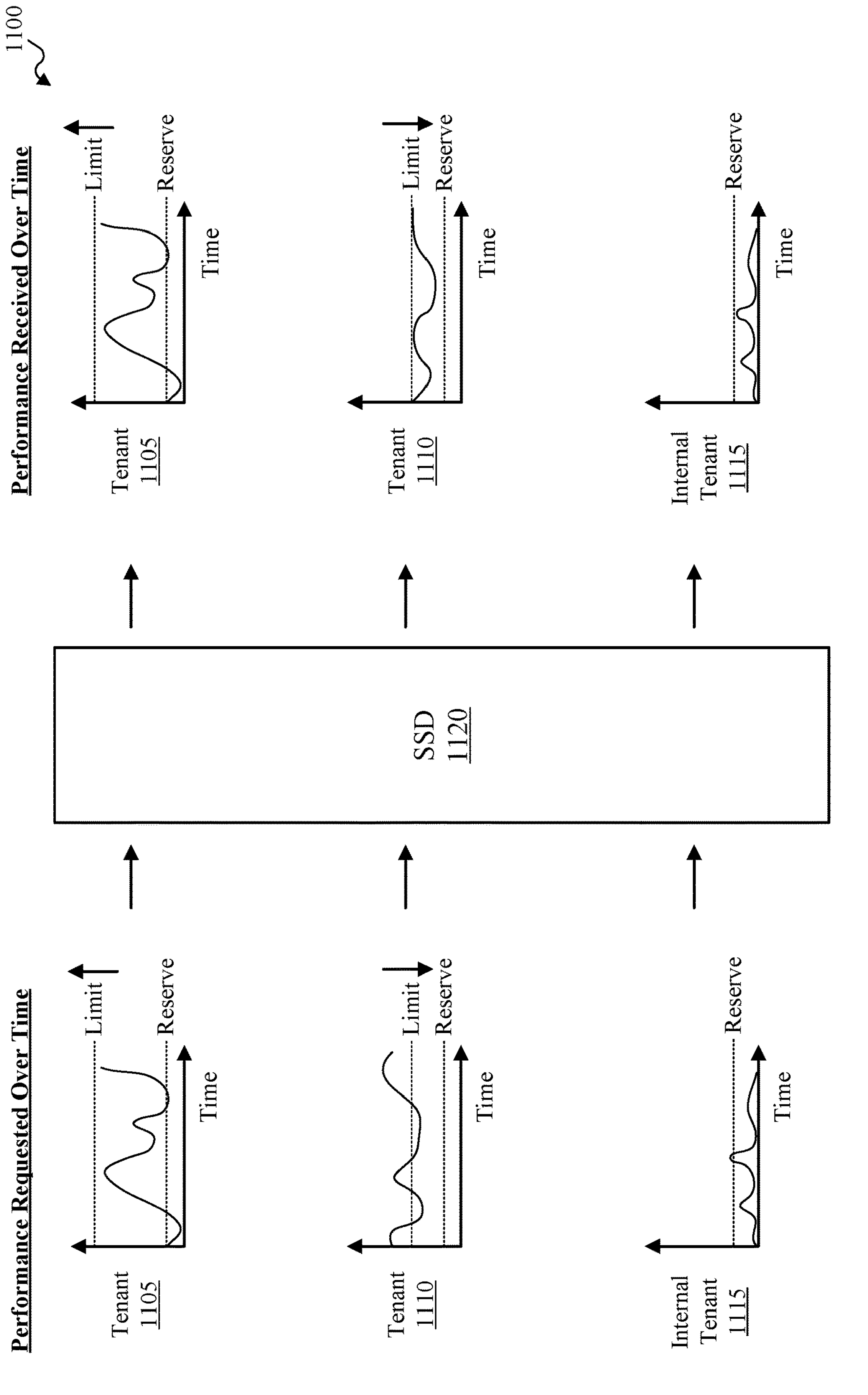

FIG. 11 illustrates an example system 1100 in accordance with one or more implementations as described herein. System 1100 may represent multiple tenants accessing a computing resource (e.g., a storage computing resource). As shown, system 1100 includes tenant 1105, tenant 1110, internal tenant 1115, and SSD 1120 (e.g., a computing resource such as computing resource 415). In some cases, SSD 1120 may include one or more internal tenants (e.g., internal tenant 1115) to monitor and/or manage internal SSD operations (e.g., for internal maintenance of SSD 1120).

In some examples, tenant 1105, tenant 1110, and internal tenant 1115 may be configured with one or more multi-tenancy configuration parameters. As shown, tenant 1105 may be associated with a first limit and first reserve relative to its tenant load over time, tenant 1110 may be associated with a second limit and second reserve relative to its tenant load over time, and internal tenant 1115 may be associated with an internal reserve (e.g., but not an internal limit) relative to its tenant load over time. As shown, tenant 1105 may receive a first level of performance from SSD 1120 based on the first limit and/or first reserve, tenant 1110 may receive a second level of performance from SSD 1120 based on the second limit and/or second reserve, and internal tenant 1115 may receive an internal level of performance from SSD 1120 based on the internal reserve.

In the illustrated example, the limit setting of tenant 1105 may be increased (e.g., by a host of tenant 1105 and/or SSD 1120). For example, SSD 1120 may temporarily increase a limit of tenant 1105 based on a temporary request from a host of tenant 1105. In some cases, tenant 1105 may pay for an increased level of performance (e.g., a temporary or permanent increase in performance consistency).

In some cases, the limit setting of tenant 1105 may be increased to improve a consistency of performance received by tenant 1105. For example, increasing the limit setting of tenant 1105 may increase the priority of tenant 1105 relative to the performance received by other tenants (e.g., tenant 1110 and/or internal tenant 1115). As shown, increasing the limit setting of tenant 1105 degrades the average variations of other tenants (e.g., tenant 1110 and/or internal tenant 1115). Additionally, or alternatively, the arbitration strength setting of tenant 1105 may be increased to improve the consistency of performance. A consistent high arbitration demand tenant receives more constant access to the resources of SSD 1120. For example, increasing the arbitration strength of tenant 1105 may increase the priority of tenant 1105 relative to the performance received by other tenants (e.g., tenant 1110 and/or internal tenant 1115, etc.). With increased arbitration strength, tenant 1105 is configured to win arbitration more reliably (e.g., when competing for the same resource of SSD 1120 with one or more other tenants such as tenant 1110, etc.). As shown, increasing arbitration winning of tenant 1105 means the average variations of tenants with less arbitration strength (e.g., tenant 1110) are expected to degrade.

In some approaches, a low priority tenant and a high priority tenant compete for resources and access to an SSD. In some examples, the limit setting and/or arbitration strength setting of a lower priority may increase, resulting in tighter control on variation may be placed on a lower priority tenant where a higher priority tenant may receive degradation in performance because the lower priority tenant is allowed to win arbitration at a higher rate.

Figure 12:
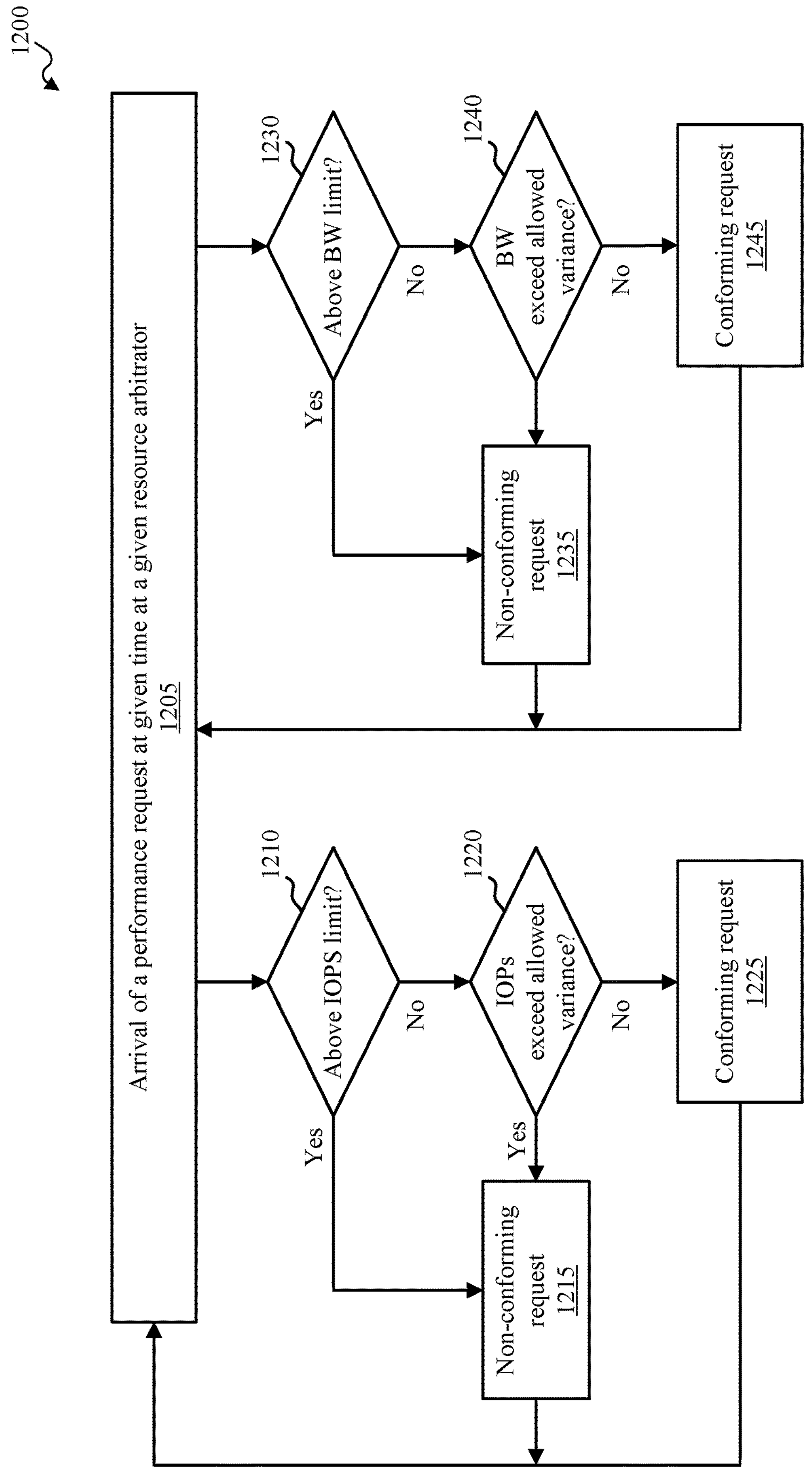
FIG. 12 depicts a flow diagram illustrating an example method associated with the disclosed systems, in accordance with example implementations described herein.

FIG. 12 depicts a flow diagram illustrating an example method 1200 associated with the disclosed systems, in accordance with example implementations described herein. In some configurations, method 1200 may be implemented by multitenancy controller 140 of FIG. 1 and/or multitenancy controller 230 of FIG. 2. In some configurations, method 1200 may be implemented in conjunction with machine 105, components of machine 105, or any combination thereof. The depicted method 1200 is just one implementation and one or more operations of method 1200 may be rearranged, reordered, omitted, and/or otherwise modified such that other implementations are possible and contemplated.

At 1205, method 1200 may include a performance request arriving at a given time at a given resource arbitrator (e.g., resource arbitrator of a computing resource such as computing resource 415 of FIG. 4, etc.). A performance request may be based on the performance requested by a tenant. Examples of a performance request may include at least one of IOPS limit 515, reserved IOPS 520, bandwidth limit 525, reserved bandwidth 530, arbitration bandwidth strength 535, arbitration IOPS strength 540, variation limit 545, access consistency 550, and/or access latency 555. For example, a resource arbitrator of multitenancy controller 140 may receive and process a performance request of a host tenant.

At 1210, method 1200 may include determining whether the performance request exceeds an IOPS limit assigned to the host tenant. For example, multitenancy controller 140 may determine whether the performance request exceeds the assigned IOPS limit. When it is determined that the performance request exceeds the IOPS limit assigned to the host tenant, method 1200 may proceed to 1215. When it is determined that the performance request does not exceed the IOPS limit assigned to the host tenant, method 1200 may proceed to 1220.

At 1215, method 1200 may include indicating that the performance request is a non-conforming request. For example, multitenancy controller 140 may indicate to a host of the host tenant (e.g., via control path PF0) that the performance request is a non-conforming request. In some cases, multitenancy controller 140 may provide a performance level to the host tenant that is lower than the performance requested.

At 1220, method 1200 may include determining whether the performance request exceeds an allowed IOPS variance assigned to the host tenant. For example, multitenancy controller 140 may determine whether the performance requested exceeds the allowed IOPS variance, where the allowed IOPS variance indicates a range by which performance received by the host tenant may vary from a baseline level of IOPS performance over time (e.g., allowed variance of 25% above or below a baseline level of IOPS performance over time). When it is determined that the performance requested exceeds the allowed IOPS variance assigned to the host tenant, method 1200 may proceed to 1215. When it is determined that the performance request does not exceed the allowed IOPS variance, method 1200 may proceed to 1225. In some cases, IOPS variance may be requested by the host. IOPS variance may be related to a real world measure such as a number of IOs being outside of some variation bounds (e.g., 5%) over a time period (e.g., 1 second). In some cases, IOPS variance may be an arbitrary ratio. Tenant 1 may have IO variation of 3 on a scale of 1-10, and Tenant 2 may have IO variation of 7 on the same 1-10 scale. Relatively, 7 may mean the SSD tries to maintain tighter variation for Tenant 2, and as a result, Tenant 2 may win resources more reliably due to the higher IOPS variation.

At 1225, method 1200 may include indicating that the performance request is a conforming request. For example, multitenancy controller 140 may indicate to a host of the host tenant that the performance request is a conforming request. In some cases, multitenancy controller 140 may provide a performance level to the host tenant that aligns with the performance requested.

At 1230, method 1200 may include determining whether the performance request exceeds bandwidth limit assigned to the host tenant. For example, multitenancy controller 140 may determine whether the performance request exceeds the assigned bandwidth limit. When it is determined that the performance request exceeds the bandwidth limit assigned to the host tenant, method 1200 may proceed to 1235. When it is determined that the performance request does not exceed the bandwidth limit assigned to the host tenant, method 1200 may proceed to 1240.

At 1235, method 1200 may include indicating that the performance request is a non-conforming request. For example, multitenancy controller 140 may indicate to a host of the host tenant (e.g., via control path PF0) that the performance request is a non-conforming request. In some cases, multitenancy controller 140 may provide a performance level to the host tenant that is lower than the performance requested.

At 1240, method 1200 may include determining whether the performance request exceeds an allowed bandwidth variance assigned to the host tenant. For example, multitenancy controller 140 may determine whether the performance requested exceeds the allowed bandwidth variance, where the allowed bandwidth variance indicates a range by which performance received by the host tenant may vary from a baseline level of bandwidth over time (e.g., allowed variance of 25% above or below a baseline level of bandwidth over time). When it is determined that the performance requested exceeds the allowed bandwidth variance assigned to the host tenant, method 1200 may proceed to 1235. When it is determined that the performance request does not exceed the allowed bandwidth variance, method 1200 may proceed to 1245.

At 1245, method 1200 may include indicating that the performance request is a conforming request. For example, multitenancy controller 140 may indicate to a host of the host tenant that the performance request is a conforming request. In some cases, multitenancy controller 140 may provide a performance level to the host tenant that aligns with the performance requested.

According to the disclosed systems and methods, a leaky bucket algorithm may be implemented for scheduling tenant access to SSD resources. In some cases, method 1200 may be based on a leaky bucket algorithm. For requests (e.g., request commands) that conform on both IOPS and bandwidth, that request may be allowed to win the resource and move on. In some cases, a token count may be modified (e.g., increased, decreased) for this request. In some aspects, when the SSD recognizes a tenant is in danger of violating its I/O variation, a temporary allocation of additional tokens may be provided to the tenant. In this example, another tenant may lose tokens because I/O variation for this tenant is within an allowable range. For non-conforming requests, the non-conforming requests on either branch may be put into a buffer (e.g., first in first out buffer). Additionally, or alternatively, the arbitration process may continue to execute until some or all commands do conform. For example, the command may be blocked and the tenant may wait for sufficient tokens to accumulate. In some cases, a command may be broken into smaller portions (e.g., by SSD, by host, by tenant), which may proceed in part. In some cases, a portion of a request may proceed (e.g., allow 25% of the requested performance to proceed). In some cases, a computing resource (e.g., SSD) may perform traffic shaping, access shaping, traffic policing, and/or access policing. Access policing and/or traffic policing may include the computing resource sending a signal to the host to instruct the host to modify its behavior and/or the behavior of one or more tenants of the host.

In some cases, method 1200 may be extended to various performance indicators. For example, method 1200 may be extended to at least one of input/output operations per second (IOPS) per tenant (e.g., maximum IOPS per tenant), bandwidth per tenant (e.g., maximum bandwidth per tenant), reserved IOPS per tenant, reserved bandwidth per tenant, and/or quality of service (QOS) per tenant. In some cases, QoS per tenant may be based on an allowed variation of performance per tenant (e.g., allowed variation of performance of a tenant relative to one or more other tenants). Additionally, or alternatively, method 1200 may be extended to at least one of priority and arbitration weight between tenants over contested resources, extensibility to one or more computing resources (e.g., one or more SSDs), tenant workloads, SSD workloads, and/or modification (e.g., at least temporary modification) of multitenancy parameters (e.g., IOPS limit, bandwidth limit, reserved IOPS, reserved bandwidth, etc.) based on resource contention. Additionally, or alternatively, method 1200 may be extended to at least one of incorporation of write amplification factor (WAF) and/or internal device traffic (e.g., SSD maintenance). In some examples, the arbitration scheme of method 1200 above may be applied to various command or operation types. (e.g., read operations, write operations, data modification operations, copy operations, deallocation operations, garbage collection operations, etc.). In some examples, host requested arbitration behavior of tenants may be implemented based on a generic cell rate algorithm (GCRA). For example, method 1200 may be based one or more aspects of the GCRA.

Figure 13:
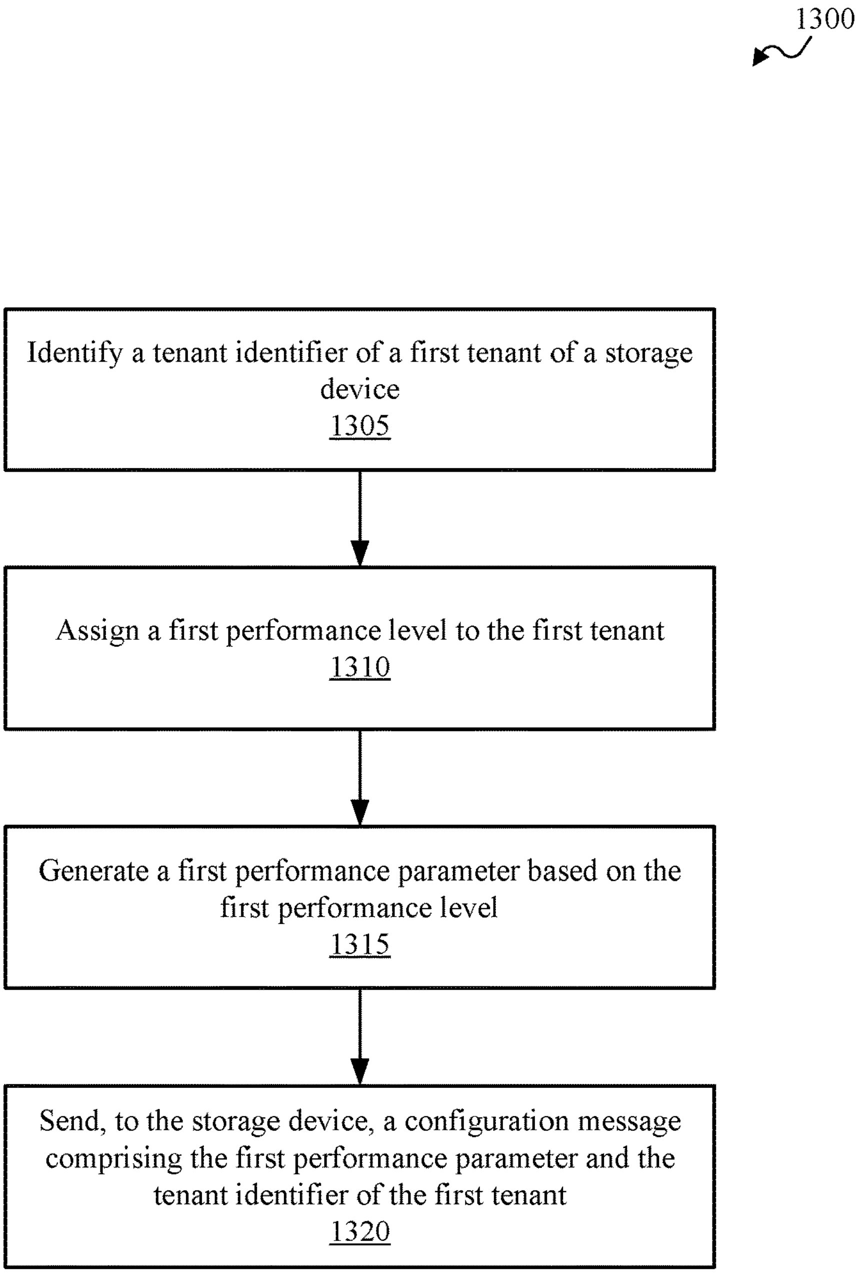
FIG. 13 depicts a flow diagram illustrating an example method associated with the disclosed systems, in accordance with example implementations described herein.

FIG. 13 depicts a flow diagram illustrating an example method 1300 associated with the disclosed systems, in accordance with example implementations described herein. In some configurations, method 1300 may be implemented by multitenancy controller 140 of FIG. 1 and/or multitenancy controller 230 of FIG. 2. In some configurations, method 1300 may be implemented in conjunction with machine 105, components of machine 105, or any combination thereof. The depicted method 1300 is just one implementation and one or more operations of method 1300 may be rearranged, reordered, omitted, and/or otherwise modified such that other implementations are possible and contemplated.

At 1305, method 1300 may include identifying an identifier of a first tenant of a storage device. For example, computing resource 415 may identify (e.g., based on message 500) an identifier of a first tenant of computing resource 415.

At 1310, method 1300 may include assigning a first performance level to the first tenant. For example, computing resource 415 may assign a first performance level to the first tenant.

At 1315, method 1300 may include generating a first performance parameter based on the first performance level. For example, host 410 may generate a first performance parameter based on the first performance level (e.g., based on communication from computing resource 415).

At 1320, method 1300 may include sending, to the storage device, a configuration message comprising the first performance parameter and the identifier of the first tenant. For example, host 410 may send, to computing resource 415, a configuration message, where the fields of the configuration message include the first performance parameter and the identifier of the first tenant.

Figure 14:
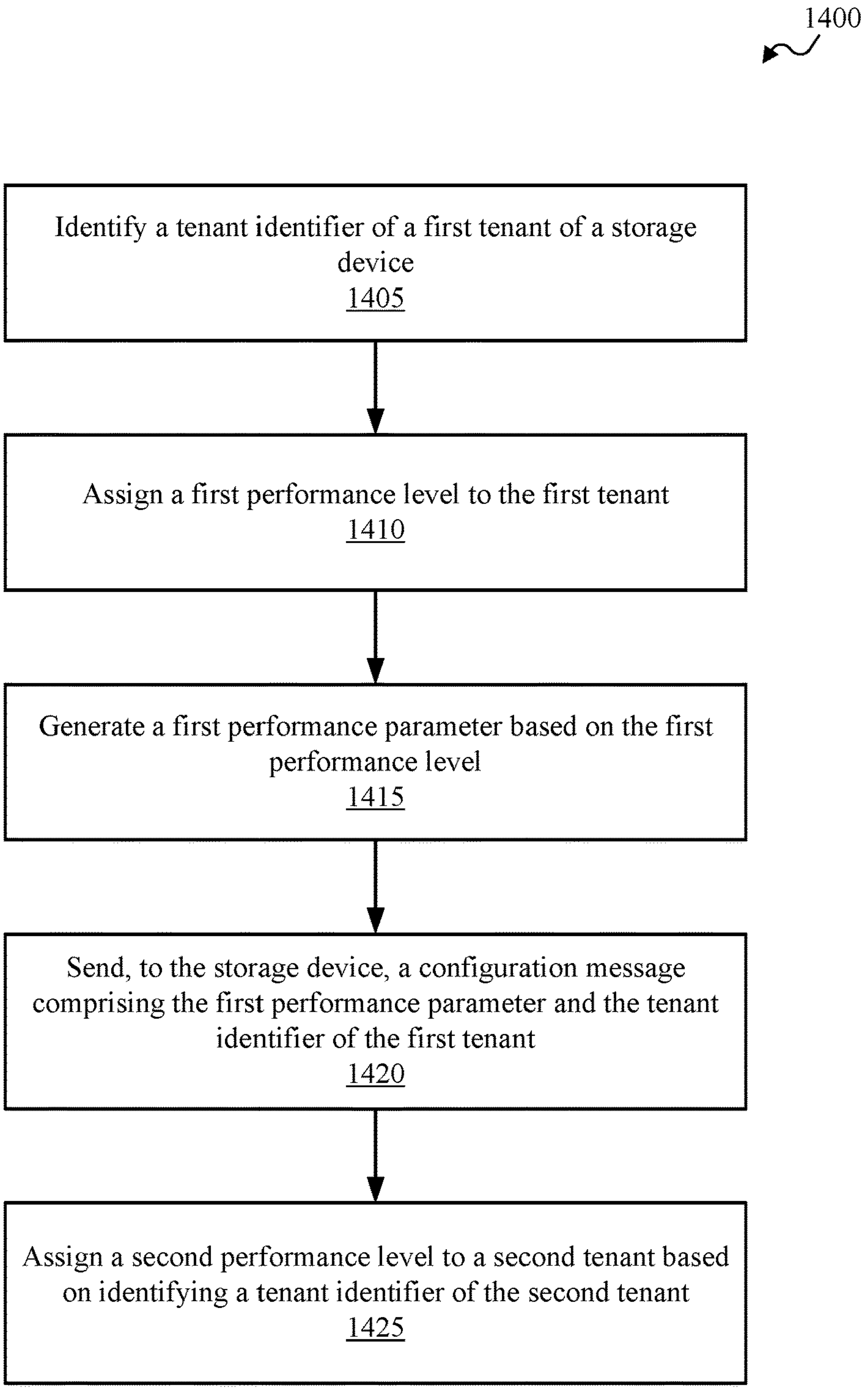
FIG. 14 depicts a flow diagram illustrating an example method associated with the disclosed systems, in accordance with example implementations described herein.

FIG. 14 depicts a flow diagram illustrating an example method 1400 associated with the disclosed systems, in accordance with example implementations described herein. In some configurations, method 1400 may be implemented by multitenancy controller 140 of FIG. 1 and/or multitenancy controller 230 of FIG. 2. In some configurations, method 1400 may be implemented in conjunction with machine 105, components of machine 105, or any combination thereof. The depicted method 1400 is just one implementation and one or more operations of method 1400 may be rearranged, reordered, omitted, and/or otherwise modified such that other implementations are possible and contemplated.

At 1405, method 1400 may include identifying an identifier of a first tenant of a storage device. For example, computing resource 415 may identify (e.g., based on message 500) an identifier of a first tenant of computing resource 415.

At 1410, method 1400 may include assigning a first performance level to the first tenant. For example, computing resource 415 may assign a first performance level to the first tenant.

At 1415, method 1400 may include generating a first performance parameter based on the first performance level. For example, host 410 may generate a first performance parameter based on the first performance level (e.g., based on communication from computing resource 415).

At 1420, method 1400 may include sending, to the storage device, a configuration message comprising the first performance parameter and the identifier of the first tenant. For example, host 410 may send, to computing resource 415, a configuration message, where the fields of the configuration message include the first performance parameter and the identifier of the first tenant. In some cases, host 410 may send to computing resource 415 a sequence of configuration messages for multiple tenants, where each configuration message in the sequence of configuration messages corresponds to one of the multiple tenants. For example, host 410 may send a first configuration message in the sequence of configuration messages, send a second configuration message in the sequence of configuration messages, and so on, where the first configuration message corresponds to a first tenant, the second configuration message corresponds to a second tenant, and so on.

At 1425, method 1400 may include assigning a second performance level to a second tenant based on identifying an identifier of the second tenant. For example, multitenancy controller 140 may assign a second performance level to a second tenant based on identifying the identifier of the second tenant.

Figure 15:
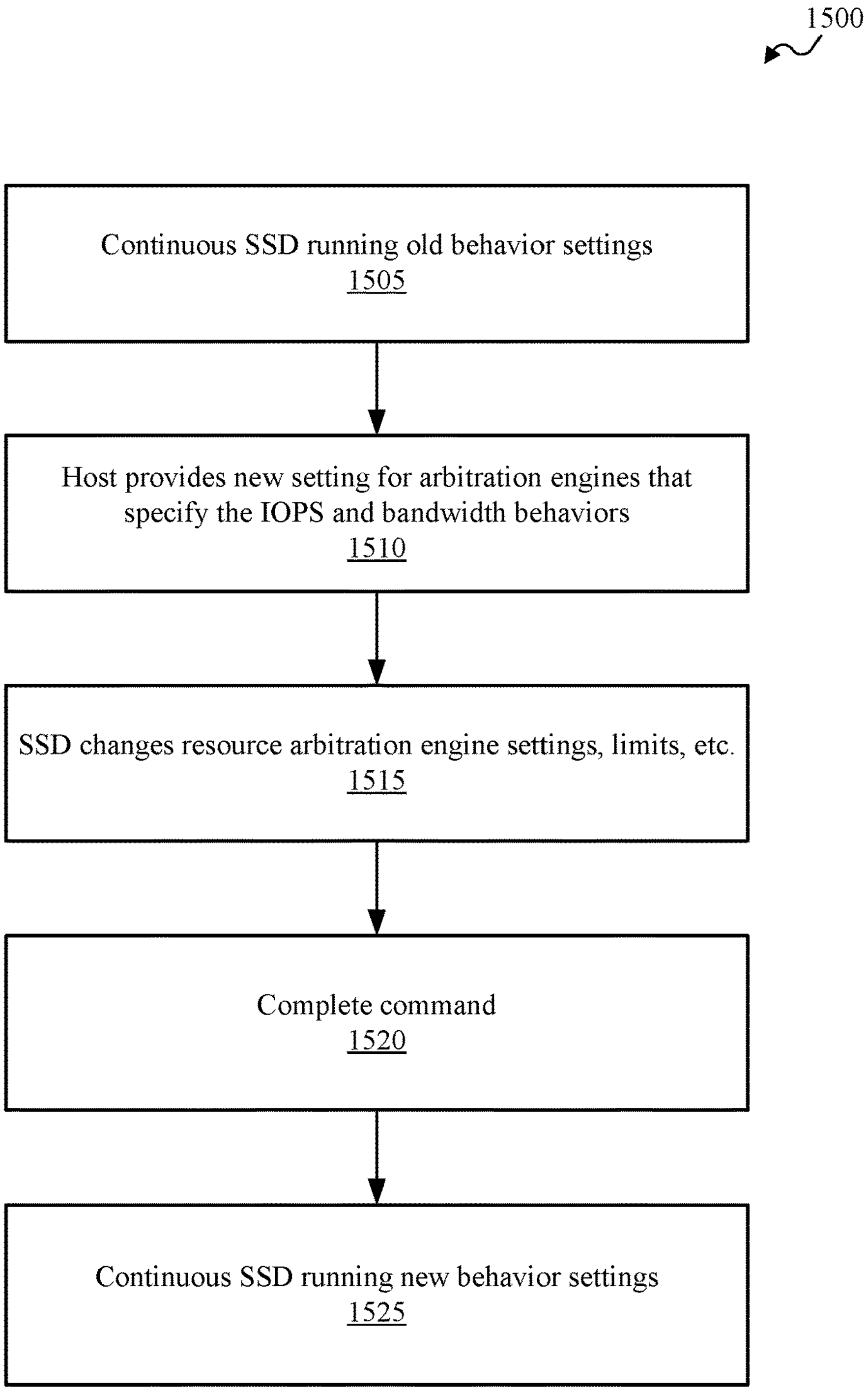
FIG. 15 depicts a flow diagram illustrating an example method associated with the disclosed systems, in accordance with example implementations described herein.

FIG. 15 depicts a flow diagram illustrating an example method 1500 associated with the disclosed systems, in accordance with example implementations described herein. In some configurations, method 1300 may be implemented by multitenancy controller 140 of FIG. 1 and/or multitenancy controller 230 of FIG. 2. In some configurations, method 1300 may be implemented in conjunction with machine 105, components of machine 105, or any combination thereof. The depicted method 1300 is just one implementation and one or more operations of method 1300 may be rearranged, reordered, omitted, and/or otherwise modified such that other implementations are possible and contemplated.

At 1505, method 1500 may include a continuous SSD running old behavior settings. For example, computing resource 415 may be running first behavior settings.

At 1510, method 1500 may include a host providing new setting for arbitration engines that specify the IOPS and bandwidth behaviors. For example, host 410 may provide second behavior settings or behavior setting updates. In some cases, the second behavior settings may specify new settings for IOPS and/or bandwidth behaviors.

At 1515, method 1500 may include the SSD changing resource arbitration engine settings, limits, etc. For example, computing resource 415 may change resource arbitration engine settings, limits, etc., based on receiving the second behavior settings.

At 1520, method 1500 may include completing the command. For example, based on receiving the second behavior settings (e.g., a command from host 410), computing resource 415 may complete implementation of the modifications indicated in the second behavior settings.

At 1525, method 1500 may include the continuous SSD running new behavior settings. For example, computing resource 415 may continue operation based on implementation of the modifications indicated in the second behavior settings.

Figure 16:
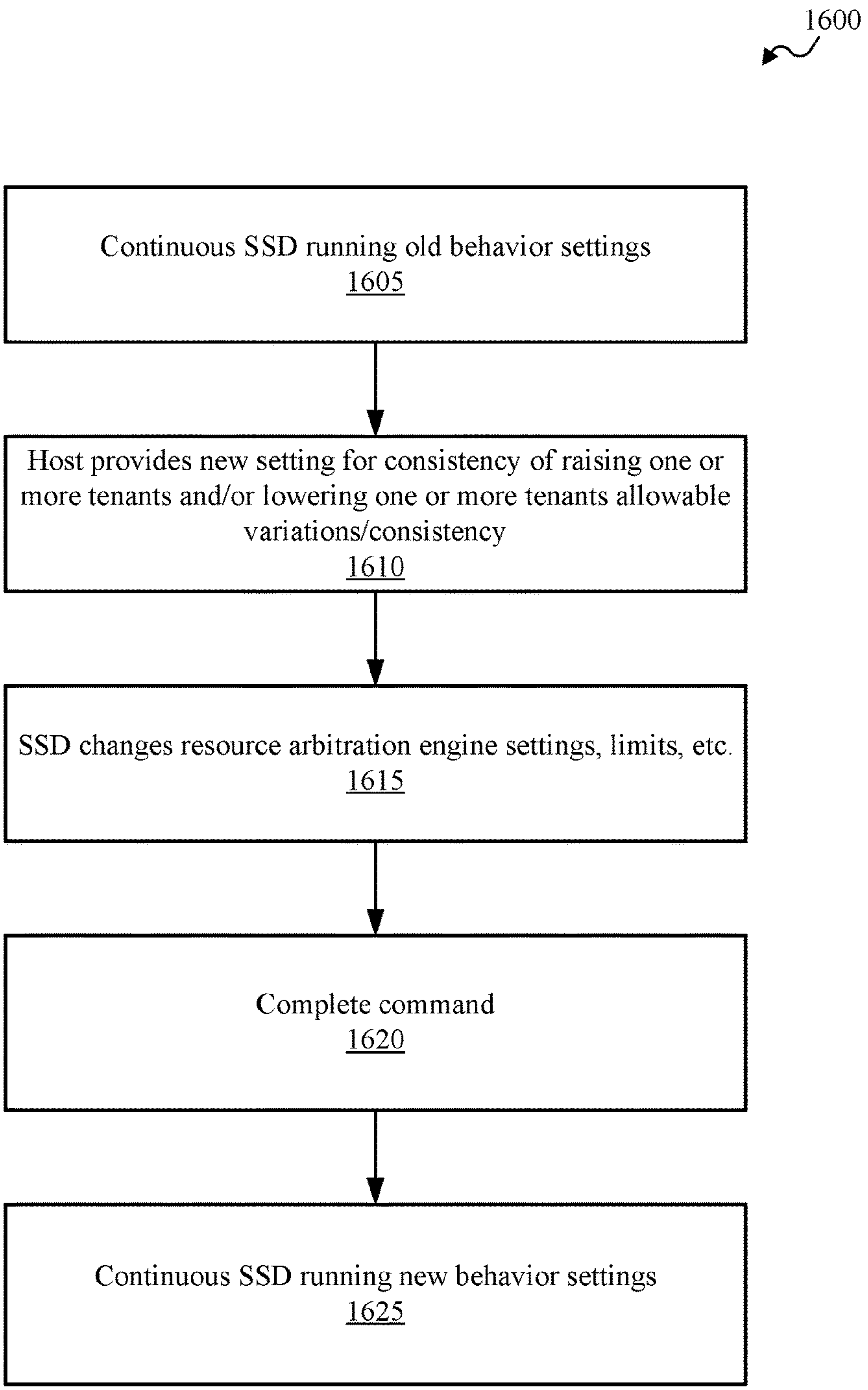
FIG. 16 depicts a flow diagram illustrating an example method associated with the disclosed systems, in accordance with example implementations described herein.

FIG. 16 depicts a flow diagram illustrating an example method 1600 associated with the disclosed systems, in accordance with example implementations described herein. In some configurations, method 1600 may be implemented by multitenancy controller 140 of FIG. 1 and/or multitenancy controller 230 of FIG. 2. In some configurations, method 1600 may be implemented in conjunction with machine 105, components of machine 105, or any combination thereof. The depicted method 1600 is just one implementation and one or more operations of method 1600 may be rearranged, reordered, omitted, and/or otherwise modified such that other implementations are possible and contemplated.

At 1605, method 1600 may include a continuous SSD running old behavior settings. For example, computing resource 415 may be running first behavior settings.

At 1610, method 1600 may include a host providing new settings for consistency of raising allowable variations/consistency of a first set one or more tenants and/or lowering allowable variations/consistency of a second set one or more tenants. For example, host 410 may provide second behavior settings or updated behavior settings. In some cases, the second behavior settings may include settings for consistency. In some examples, the second behavior settings may include settings for raising allowable variations and/or consistency of one or more tenants and/or lowering allowable variations and/or consistency of one or more tenants. In some cases, host 410 may send to computing resource 415 an aggregated configuration message for multiple tenants, where the configuration message corresponds to the settings of multiple tenants. For example, host 410 may send an aggregated configuration message to computing resource 415, where the aggregated configuration message indicates a first tenant and a requested performance level (e.g., an updated performance level) of the first tenant, indicates a second tenant and a requested performance level (e.g., an updated performance level) of the second tenant, and so on.

At 1615, method 1600 may include the SSD changing resource arbitration engine settings, limits, etc. For example, computing resource 415 may change resource arbitration engine settings, limits, etc., based on receiving the second behavior settings.

At 1620, method 1600 may include completing the command. For example, based on receiving the second behavior settings (e.g., a command from host 410), computing resource 415 may complete implementation of the modifications indicated in the second behavior settings.

At 1625, method 1600 may include the continuous SSD running new behavior settings. For example, computing resource 415 may continue operation based on implementation of the modifications indicated in the second behavior settings.

Figure 17:
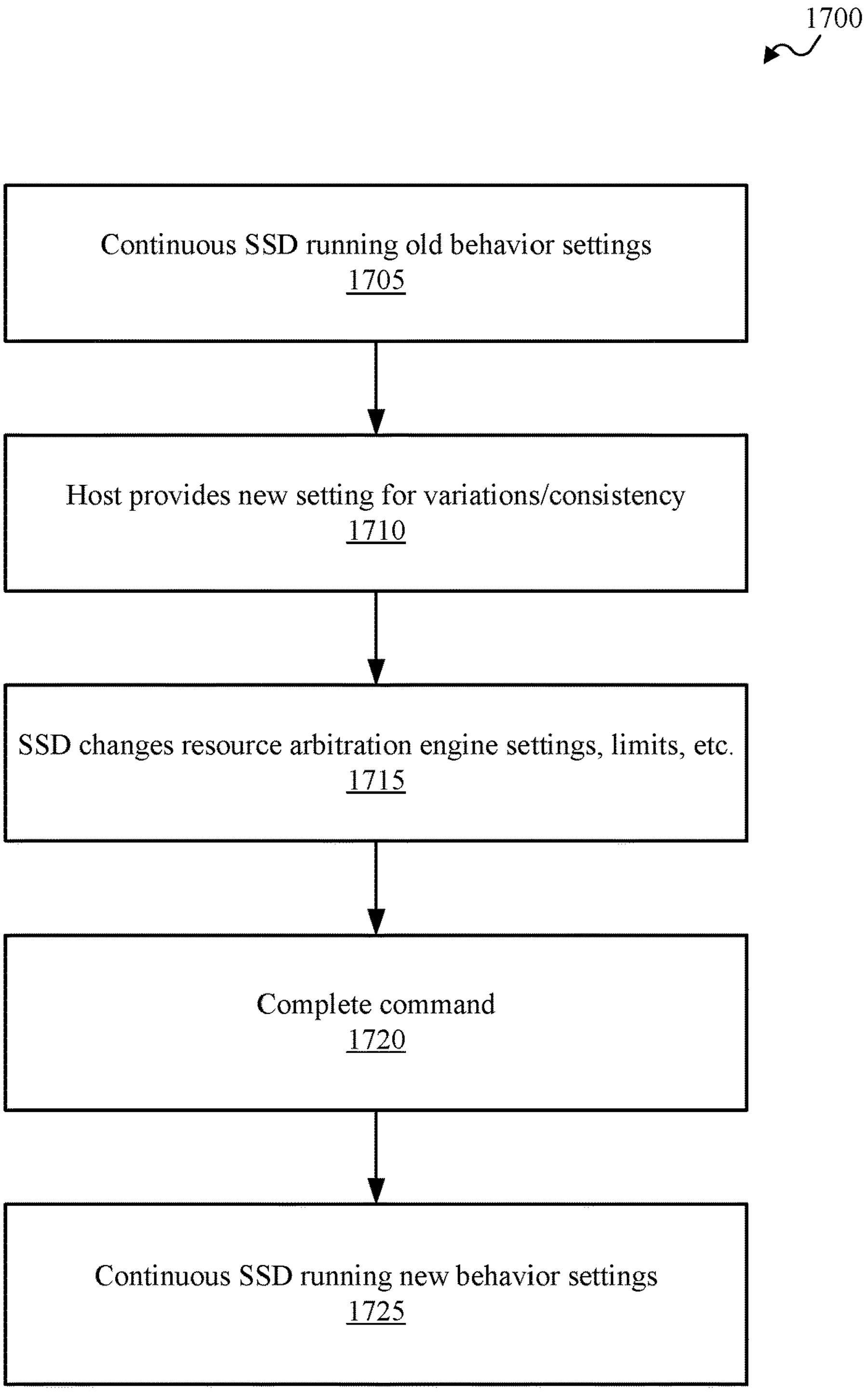
FIG. 17 depicts a flow diagram illustrating an example method associated with the disclosed systems, in accordance with example implementations described herein.

FIG. 17 depicts a flow diagram illustrating an example method 1700 associated with the disclosed systems, in accordance with example implementations described herein. In some configurations, method 1700 may be implemented by multitenancy controller 140 of FIG. 1 and/or multitenancy controller 230 of FIG. 2. In some configurations, method 1700 may be implemented in conjunction with machine 105, components of machine 105, or any combination thereof. The depicted method 1700 is just one implementation and one or more operations of method 1700 may be rearranged, reordered, omitted, and/or otherwise modified such that other implementations are possible and contemplated.

At 1705, method 1700 may include a continuous SSD running old behavior settings. For example, computing resource 415 may be running first behavior settings.

At 1710, method 1700 may include a host providing a new setting for variations/consistency. For example, host 410 may provide second behavior settings or updated behavior settings. In some cases, the second behavior settings may include settings for consistency and/or variations. For example, the second behavior settings may include settings for indicating expectations for consistent performance for one or more tenants. Additionally, or alternatively, the second behavior settings may include settings for indicating expectations for variation in performance for one or more tenants (e.g., acceptable variation of performance of a tenant relative to one or more other tenants).

At 1715, method 1700 may include the SSD changing resource arbitration engine settings, limits, etc. For example, computing resource 415 may change resource arbitration engine settings, limits, etc., based on receiving the second behavior settings.

At 1720, method 1700 may include completing the command. For example, based on receiving the second behavior settings (e.g., a command from host 410), computing resource 415 may complete implementation of the modifications indicated in the second behavior settings.

At 1725, method 1700 may include the continuous SSD running new behavior settings. For example, computing resource 415 may continue operation based on implementation of the modifications indicated in the second behavior settings.

Figure 18:
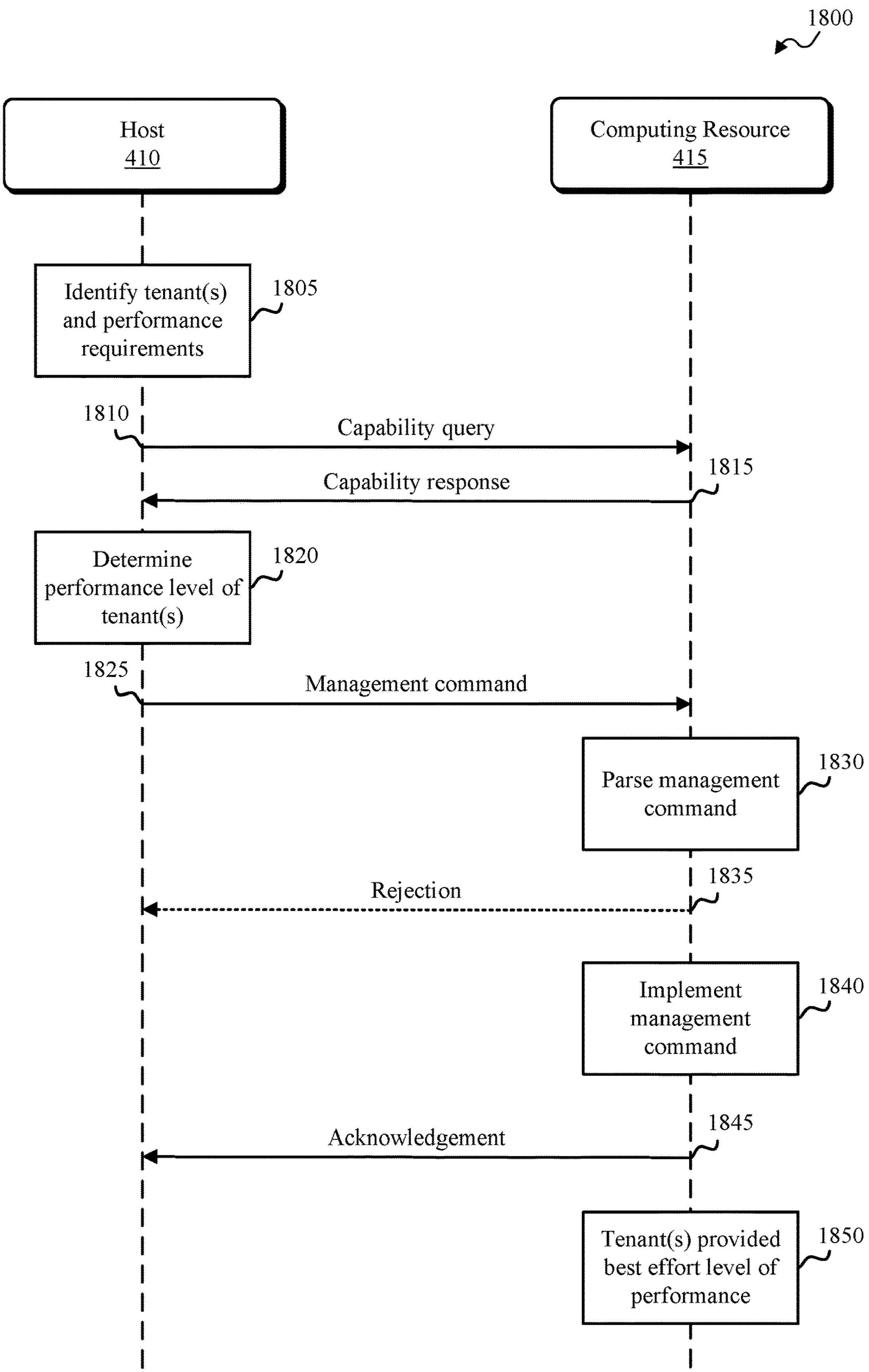
FIG. 18 depicts a flow diagram illustrating an example method associated with the disclosed systems, in accordance with example implementations described herein.

FIG. 18 depicts a flow diagram illustrating an example method 1800 associated with the disclosed systems, in accordance with example implementations described herein. In some configurations, method 1800 may be implemented by multitenancy controller 140 of FIG. 1 and/or multitenancy controller 230 of FIG. 2. In some configurations, method 1800 may be implemented in conjunction with machine 105, components of machine 105, or any combination thereof. The depicted method 1800 is just one implementation and one or more operations of method 1800 may be rearranged, reordered, omitted, and/or otherwise modified such that other implementations are possible and contemplated.

At 1805, method 1800 may include host 410 identifying one or more tenants and determining performance requirements of each of the one or more tenants.

At 1810, method 1800 may include host 410 sending a capability query to computing resource 415. In some cases, host 410 may perform 1805 and 1810 in sequence (e.g., 1805 then 1810, or 1810 then 1805) or simultaneously (e.g., 1805 and 1810 performed relatively at the same time).

At 1815, method 1800 may include computing resource 415 sending a capability response to host 410. In some examples, host 410 may store the capability response. In some cases, the capability response may indicate one or more capabilities of computing resource 415. Examples of the one or more capabilities of computing resource 415 may include write speed, read speed, write latency, read latency, random data access latency, cache size, cache bandwidth, cache latency, firmware version, boot time, data bandwidth, power requirements, energy efficiency, how many tenants can be supported, what identifiers computing resource 415 supports for multi-tenancy, and the like.

At 1820, method 1800 may include host 410 determining a performance level to assign to each of the one or more tenants. For example, host 410 may determine how to use and/or allocate the indicated capabilities of computing resource 415.

At 1825, method 1800 may include host 410 sending a management command (e.g., multi-tenancy settings command) to computing resource 415. In some cases, host 410 may send a management command to computing resource 415 to set up the performance level of the one or more tenants. In some cases, host 410 may send the management command via PF0.

At 1830, method 1800 may include computing resource 415 parsing the management command. For example, computing resource 415 may receive the management command, identify the fields of the management command, and store the data values in each field.

At 1835, method 1800 may optionally include computing resource 415 sending a rejection message to host 410. In some examples, host 410 may receive a rejection message from computing resource 415 based on an error or deficiency that computing resource 415 detects in the management command. In some cases, host 410 may send a first management command of a first tenant and a second management command of a second tenant. In some cases, host 410 may send the first management command and the second management command as separate messages, or as an aggregated management command for multiple tenants. In response, host 410 may receive from computing resource 415 an acknowledgment for the first tenant indicating the performance level for the first tenant is accepted and being implemented and a rejection message for the second tenant indicating the request for the second tenant is rejected based on an error detected in the respective request. For example, computing resource 415 may not decipher one of the fields in the second management command. For instance, the rejection may be based on an error of a field not having a value, based on an error of a field having an indetermined value, based on a field having an out of bounds value (e.g., value exceeds a value threshold for that field), based on a transmission error that corrupts one or more fields, etc. In some cases, computing resource 415 may determine that it does not have sufficient granularity and/or sufficient performance capabilities to meet the level of performance being requested for the second tenant (e.g., requested level of performance exceeds performance availability threshold of computing resource 415).

At 1840, method 1800 may include computing resource 415 implementing the management command respective to each of the one or more tenants. In some examples, computing resource 415 may configure internal aspects of computing resource 415 to meet the multi-tenancy settings requested by the host 410 via the management command.

At 1845, method 1800 may include computing resource 415 sending an acknowledgment to host 410. For example, computing resource 415 may indicate (e.g., via PF0) that implementation of the management command is successful. If computing resource 415 cannot meet or accomplish the requested performance, and/or if the host 410 request violates a capability of computing resourced 415, then computing resource 415 may indicate an error in the acknowledgement rather than indicates successful implementation. In some cases, computing resource 415 may send an acknowledgment that includes at least one acknowledgement and/or at least one rejection. For example, host 410 may receive from computing resource 415 one message that includes an acknowledgment for a first tenant and a rejection message for a second tenant.

At 1850, method 1800 may include computing resourced 415 providing a best effort level of performance to each of the one or more tenants.

Figure 19:
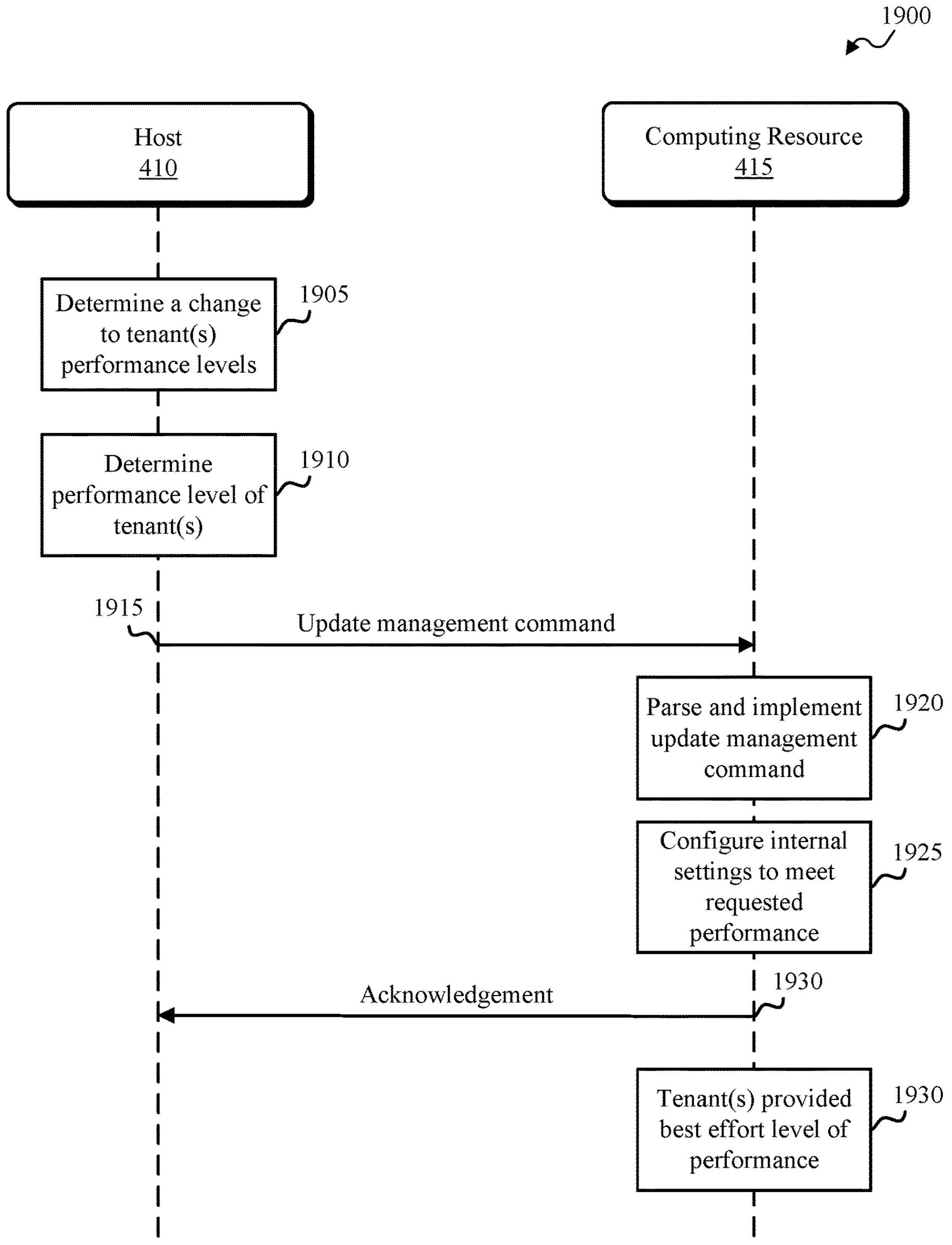
FIG. 19 depicts a flow diagram illustrating an example method associated with the disclosed systems, in accordance with example implementations described herein.

FIG. 19 depicts a flow diagram illustrating an example method 1900 associated with the disclosed systems, in accordance with example implementations described herein. In some configurations, method 1900 may be implemented by multitenancy controller 140 of FIG. 1 and/or multitenancy controller 230 of FIG. 2. In some configurations, method 1900 may be implemented in conjunction with machine 105, components of machine 105, or any combination thereof. The depicted method 1900 is just one implementation and one or more operations of method 1900 may be rearranged, reordered, omitted, and/or otherwise modified such that other implementations are possible and contemplated.

At 1905, method 1900 may include host 410 determining a change to the performance levels of the one or more tenants. For example, host 410 may determine to change performance levels of at least one tenant. In some cases, host 410 may detect a change in operating conditions (e.g., a tenant requires more performance, less performance, etc.), one or more tenants are added and/or removed (e.g., net addition, net reduction of tenants) in relation to the computing resource, etc. Accordingly, host 410 may determine how to use and/or allocate the capabilities of computing resource 415 based on changing conditions. In some examples, host 410 may store the capability response of computing resource 415 and determine how to use and/or allocate the capabilities of computing resource 415 based on changing conditions and/or the stored capability response.

At 1910, method 1900 may include host 410 determining a performance level to assign to each of the one or more tenants based on the updated conditions. In some examples, host 410 may determine how to use and/or allocate the indicated capabilities of computing resource 415 based on the updated conditions. For example, host 410 may store the capability response and refer to the stored capability response to determine a performance level of the tenant(s) (e.g., updated performance level).

At 1915, method 1900 may include host 410 sending an update management command (e.g., multi-tenancy settings command) to computing resource 415. In some cases, host 410 may send an update management command to computing resource 415 to update the performance level of the one or more tenants. In some cases, host 410 may send the update management command via PF0.

At 1920, method 1900 may include computing resource 415 parsing the update management command and implementing the update management command respective to each of the one or more tenants. In some examples, computing resource 415 may configure internal aspects of computing resource 415 to meet the multi-tenancy settings requested by the host 410 via the update management command.

At 1925, method 1900 may include computing resource 415 sending an acknowledgment to host 410. For example, computing resource 415 may indicate (e.g., via PF0) that implementation of the update management command is successful. If computing resource 415 cannot meet or accomplish the requested performance, and/or if the host 410 request violates a capability of computing resourced 415, then computing resource 415 may indicate an error in the acknowledgement rather than indicates successful implementation.

At 1930, method 1900 may include computing resourced 415 providing a best effort level of performance to each of the one or more tenants. In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein.

Additionally, or alternatively, the sequential and/or temporal order of the operations may be varied. Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described herein, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described herein should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of multitenancy, the method comprising:
- identifying an identifier of a first tenant of a storage device;
- assigning a first performance level to the first tenant;
- generating a first performance parameter based on the first performance level; and
- sending, to the storage device, a configuration message comprising the first performance parameter and the identifier of the first tenant.

2. The method of claim 1, wherein the identifier of the first tenant comprises a virtual function of the storage device and a reclaim unit handle of the storage device.

3. The method of claim 1, wherein the identifier of the first tenant comprises at least one of a physical function of the storage device, a port of the storage device, a stream of the storage device, a zone of the storage device, a logical block address range of the storage device, a non-volatile memory (NVM) controller of the storage device, a submission queue, or a scalable input output virtualization.

4. The method of claim 1, wherein the identifier of the first tenant comprises at least one of a computational storage thread, a graphical processor unit (GPU), a portion of a GPU, a field programmable gate array, a namespace of the storage device, an endurance group of the storage device, a reclaim group of the storage device, a command type associated with a command generated by the first tenant, or a command identifier associated with the command generated by the first tenant.

5. The method of claim 1, wherein the configuration message includes one or more tenant identifier fields.

6. The method of claim 1, wherein the configuration message includes one or more performance parameter fields based on the first performance level, the one or more performance parameter fields including at least one field for a maximum allowed input output operations per second (IOPS) on the storage device for the first tenant or for a reserved level of IOPS on the storage device for the first tenant.

7. The method of claim 1, wherein the configuration message includes one or more performance parameter fields based on the first performance level, the one or more performance parameter fields including at least one field for a maximum available communication bandwidth between the first tenant and the storage device or for a reserved level of communication bandwidth between the first tenant and the storage device.

8. The method of claim 1, wherein:
the configuration message includes a performance parameter field for a tenant load of the first tenant, the performance parameter field indicating a requested level of performance based on the first performance level, and
the tenant load of the first tenant includes at least one of a queue depth (QD) for commands generated by the first tenant or a command length associated with the commands generated by the first tenant.

9. The method of claim 1, wherein the configuration message includes one or more performance parameter fields for at least one of: a proportional bandwidth win rate of the first tenant relative to a bandwidth win rate of at least one other tenant, a proportional IOPS win rate of the first tenant relative to an IOPS win rate of the at least one other tenant, a maximum level of variation in access to the storage device over a period of time, an access consistency level between the first tenant and the storage device, or a maximum allowed access latency between the first tenant and the storage device.

10. The method of claim 1, further comprising:
identifying an identifier of a second tenant; and
assigning a second performance level to the second tenant different from the first performance level.

11. The method of claim 10, further comprising generating a second performance parameter based on the second performance level, wherein:
the second performance parameter is different from the first performance parameter, and
the configuration message comprises the second performance parameter and the identifier of the second tenant.

12. The method of claim 1, wherein a format of the configuration message is based on a format of non-volatile memory express packets.

13. The method of claim 1, wherein the storage device comprises a solid-state drive.

14. A device, comprising:
at least one memory; and
at least one processor coupled with the at least one memory configured to:
identify an identifier of a first tenant of a storage device;
assign a first performance level to the first tenant;
generate a first performance parameter based on the first performance level; and
send, to the storage device, a configuration message comprising the first performance parameter and the identifier of the first tenant.

15. The device of claim 14, further comprising:
identify an identifier of a second tenant; and
assign a second performance level to the second tenant different from the first performance level.

16. The device of claim 15, wherein the at least one processor is configured to generate a second performance parameter based on the second performance level, wherein:
the second performance parameter is different from the first performance parameter, and
the configuration message comprises the second performance parameter and the identifier of the second tenant.

17. The device of claim 14, wherein the identifier of the first tenant comprises a virtual function of the storage device and a reclaim unit handle of the storage device.

18. A non-transitory computer-readable medium storing code that comprises instructions executable by a processor of a device to:
identify an identifier of a first tenant of a storage device;
assign a first performance level to the first tenant;
generate a first performance parameter based on the first performance level; and
send, to the storage device, a configuration message comprising the first performance parameter and the identifier of the first tenant.

19. The non-transitory computer-readable medium of claim 18, wherein the code includes further instructions executable by the processor to cause the device to:
identify an identifier of a second tenant; and
assign a second performance level to the second tenant different from the first performance level.

20. The non-transitory computer-readable medium of claim 19, wherein the code includes further instructions executable by the processor to cause the device to generate a second performance parameter based on the second performance level, wherein:
the second performance parameter is different from the first performance parameter, and
the configuration message comprises the second performance parameter and the identifier of the second tenant.

* * * * *